US011861352B2

(12) United States Patent
Baral et al.

(10) Patent No.: US 11,861,352 B2
(45) Date of Patent: Jan. 2, 2024

(54) SMART DEPLOYMENT USING GRAPH OPTIMIZATION

(71) Applicant: Microsoft Technology Licensing, LLC, Redmond, WA (US)

(72) Inventors: Pallavi Baral, Redmond, WA (US); Prateek Punj, Bellevue, WA (US); Yilan Zhang, Redmond, WA (US); Bhuvan Malladihalli Shashidhara, Bellevue, WA (US); Hanyi Xu, Redmond, WA (US); Abhishek Kumar, Kirkland, WA (US); Mayank Meghwanshi, Redmond, WA (US); Sisi Xiong, Redmond, WA (US); Michael Stephenson, Woodinville, WA (US); Avnish Chhabra, Redmond, WA (US); Juan-Arturo Herrera Ortiz, Seattle, WA (US); Huaming Huang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 17/565,191

(22) Filed: Dec. 29, 2021

(65) Prior Publication Data
US 2023/0205509 A1 Jun. 29, 2023

(51) Int. Cl.
*G06F 8/65* (2018.01)
*G06N 20/00* (2019.01)

(52) U.S. Cl.
CPC ............... *G06F 8/65* (2013.01); *G06N 20/00* (2019.01)

(58) Field of Classification Search
CPC .......... G06F 8/65; G06N 20/00; G06Q 10/06; G06Q 10/063; G06Q 10/0631;
(Continued)

(56) References Cited

U.S. PATENT DOCUMENTS 7,246,075 B1 * 7/2007 Testa .................. G06Q 10/0631
705/7.22
7,870,550 B1 * 1/2011 Qureshi ............... G06F 11/079
717/170
(Continued)

FOREIGN PATENT DOCUMENTS

CN 106295880 A * 1/2017
CN 108900330 A * 11/2018 ............. H04L 41/00
(Continued)

OTHER PUBLICATIONS

"Microsoft Azure", Retrieved from: https://web.archive.org/web/20210608175022/https:/azure.microsoft.com/en-us/global-infrastructure/geographies/, Jun. 8, 2021, 6 Pages.
(Continued)

*Primary Examiner* — Daxin Wu
(74) *Attorney, Agent, or Firm* — Rainier Patents, P.S.

(57) ABSTRACT

The present concepts may automate and optimize deployment to a cloud computing fleet. Artificial intelligence and/or optimization algorithms may be used to find optimal deployment parameters (e.g., deployment order of computers in the fleet) that minimize deployment time and minimize deployment risk. For example, machine-learning prediction models may be used to generate a shortest path graph problem models a deployment planning problem. Then, optimization algorithms may be used to efficiently find approximations of Pareto-optimal solutions to the shortest path graph problem. Depending on the preferred level of time and risk, one of the solutions may be used to run the deployment.

20 Claims, 14 Drawing Sheets

(58) Field of Classification Search
CPC ........... G06Q 10/06312; G06Q 10/107; G06Q 50/30; G06Q 10/00
See application file for complete search history.

(56) References Cited

U.S. PATENT DOCUMENTS

| | | | | |
|---|---|---|---|---|
| 9,696,982 | B1* | 7/2017 | Michalik | G06F 8/65 |
| 9,741,005 | B1* | 8/2017 | Adogla | G06Q 10/0635 |
| 9,858,068 | B2* | 1/2018 | Gibson | G06F 8/656 |
| 10,003,514 | B2* | 6/2018 | Gibson | H04L 43/0876 |
| 10,120,669 | B2* | 11/2018 | Karagiannis | H04L 41/5022 |
| 10,853,046 | B2* | 12/2020 | Mudumbai | H04L 67/34 |
| 11,368,539 | B1* | 6/2022 | Chen | H04L 41/0806 |
| 11,533,240 | B2* | 12/2022 | Hudis | H04L 67/34 |
| 2006/0002291 | A1* | 1/2006 | Alicherry | H04L 45/124 370/225 |
| 2008/0306798 | A1* | 12/2008 | Anke | G06F 8/61 705/7.26 |
| 2013/0297964 | A1 | 11/2013 | Hegdal et al. | |
| 2014/0317166 | A1 | 10/2014 | Iyoob et al. | |
| 2018/0011697 | A1* | 1/2018 | Berkebile | G06Q 10/0631 |
| 2019/0026355 | A1* | 1/2019 | Yano | G06F 8/74 |
| 2019/0171438 | A1 | 6/2019 | Franchitti | |
| 2020/0089542 | A1* | 3/2020 | Nash | G06F 9/5027 |
| 2020/0334025 | A1* | 10/2020 | Wang | H04L 67/34 |
| 2021/0200526 | A1* | 7/2021 | Su | G06Q 30/0282 |
| 2022/0327012 | A1* | 10/2022 | Roy | G06N 5/01 |
| 2023/0088784 | A1* | 3/2023 | Negussie | G06F 8/77 717/102 |

FOREIGN PATENT DOCUMENTS

| | | |
|---|---|---|
| CN | 110059854 A * | 7/2019 |
| CN | 114217966 A * | 3/2022 |
| EP | 4064047 A1 * | 9/2022 |

OTHER PUBLICATIONS

"NSGA-II: Non-dominated Sorting Genetic Algorithm", Retrieved from: https://pymoo.org/algorithms/nsga2.html, Retrieved Date: Jul. 7, 2021, 2 Pages.

"Speeding up CI/CD with Machine Learning", Retrieved from: https://www.opsmx.com/blog/speeding-up-ci-cd-with-ai-ml/, Jan. 7, 2021, 15 Pages.

Bee, Electric, "How To: Rolling Deployments with CloudBees Flow", Retrieved from: https://www.cloudbees.com/blog/how-rolling-deployments-cloudbees-flow, May 30, 2017, 14 Pages.

Calle, Paul, "NSGA-II Explained!", Retrieved from: http://oklahomaanalytics.com/data-science-techniques/nsga-ii-explained/, Oct. 24, 2017, 6 Pages.

Cheikh, et al., "A Method for Selecting Pareto Optimal Solutions in Multiobjective Optimization", In Journal of Informatics and Mathematical Sciences vol. 2, No. 1, 2010, pp. 51-62.

Chitra, et al., "Multiobjective Optimization Solution for Shortest Path Routing Problem", In International Journal of Computer and Information Engineering, vol. 4, No. 2, Jan. 26, 2010, pp. 652-660.

Deb, et al., "A Fast and Elitist Multiobjective Genetic Algorithm: NSGA-II", In Journal of IEEE Transactions on Evolutionary Computation, vol. 6, Issue:, Apr. 2002, pp. 182-197.

Deb, et al., "Multi-Objective Optimization Problems (MOOP)", Retrieved from: https://engineering.purdue.edu/~sudhoff/ee630/Lecture09.pdf, 2001, pp. 1-50.

Engelbert, Chris, "Kubernetes: Resource Contention and Change Risk Assessment", Retrieved from: https://www.instana.com/blog/kubernetes-resource-contention-and-change-risk-assessment/, Nov. 17, 2020, 5 Pages.

Fang, et al., "Research on Improved NSGA-II Algorithm and its Application in Emergency Management", In Journal of Mathematical Problems in Engineering, Jan. 22, 2018, pp. 1-13.

Jin, et al., "Pareto-Based Multiobjective Machine Learning: An Overview and Case Studies", In Journal of IEEE Transactions on Systems, Man, And Cybernetics—Part C: Applications and Reviews, vol. 38, No. 3, May 2008, pp. 397-415.

Kannan, et al., "Application of NSGA-II Algorithm to Generation Expansion Planning", In Journal of IEEE Transactions on Power Systems 24, No. 1, Feb. 2009, pp. 454-461.

Martins, et al., "The Labelling Algorithm for the Multiobjective Shortest Path Problem", In TR-99/005, Nov. 1999.

Pangilinan, et al., "Evolutionary Algorithms for the Multiobjective Shortest Path Problem", In Journal of World Academy of Science, Engineering and Technology, vol. 25, Jan. 20, 2007, pp. 205-210.

Perecharla, Udaya Bhaskar, "Cloud RollOut Approach & Models", Retrieved from: https://blogs.sap.com/2017/08/28/cloud-rollout-approach-models/, Aug. 28, 2017, 6 Pages.

Russinovich, Mark, "Advancing safe deployment with AIOps—introducing Gandalf", Retrieved from: https://azure.microsoft.com/en-in/blog/advancing-safe-deployment-with-aiops-introducing-gandalf/, Jun. 30, 2021, 8 Pages.

Wang, et al., "Application of NSGA-II Algorithm for Fault Diagnosis in Power System", In Journal of Electric Power Systems Research, vol. 175, Oct. 2019.

"International Search Report and Written Opinion Issued in PCT Application No. PCT/US22/046350", dated Dec. 22, 2022, 18 Pages.

* cited by examiner

SMART DEPLOYMENT USING GRAPH OPTIMIZATION

BACKGROUND

Cloud computing services are growing and expanding globally. Users depend on and expect such services to be secure and available at all times. Thus, updates to cloud computing services should be deployed quickly and with minimal interruptions.

SUMMARY

The present concepts relate to smart orchestration of deployments in cloud computing services. Using artificial intelligence, faster and safer deployments may be achieved automatically and efficiently. For example, machine learning models may be trained to predict certain deployment objectives associated with multiple deployment options. Additionally, deployment planning problems may be modeled as multi-layer, multi-objective graph problems, which may be solved using optimization algorithms. The present concepts may enable solving computationally complex graph problems in efficient ways within a reasonable amount of time.

BRIEF DESCRIPTION OF THE DRAWINGS

The detailed description below references accompanying figures. The use of similar reference numbers in different instances in the description and the figures may indicate similar or identical items. The example figures are not necessarily to scale.

DETAILED DESCRIPTION

The present concepts relate to smart ways to deploy packages (e.g., update, payload, or any modification) to targets. The present concepts will be explained below in the context of deploying updates to target clusters in a cloud computing fleet. However, similar concepts can be applied to other contexts.

Deployment Background

Cloud computing services (e.g., computation services and storage services) may be supported by data centers in multiple geographic regions in many countries around the globe. A cloud computing fleet that provides such cloud computing services may include hardware infrastructure (e.g., servers, CPUs, networking devices, storage disks) and software infrastructure (e.g., operating systems, applications, firmware, management tools).

To fix, maintain, and/or improve the cloud computing services, certain packages may be deployed to the cloud computing fleet. Such packages may include new applications, operating system updates, software feature updates, security fixes, and/or configuration changes. Other types of packages may include hardware upgrades, system reboots, firmware updates, networking configuration changes, etc.

Figure 1:
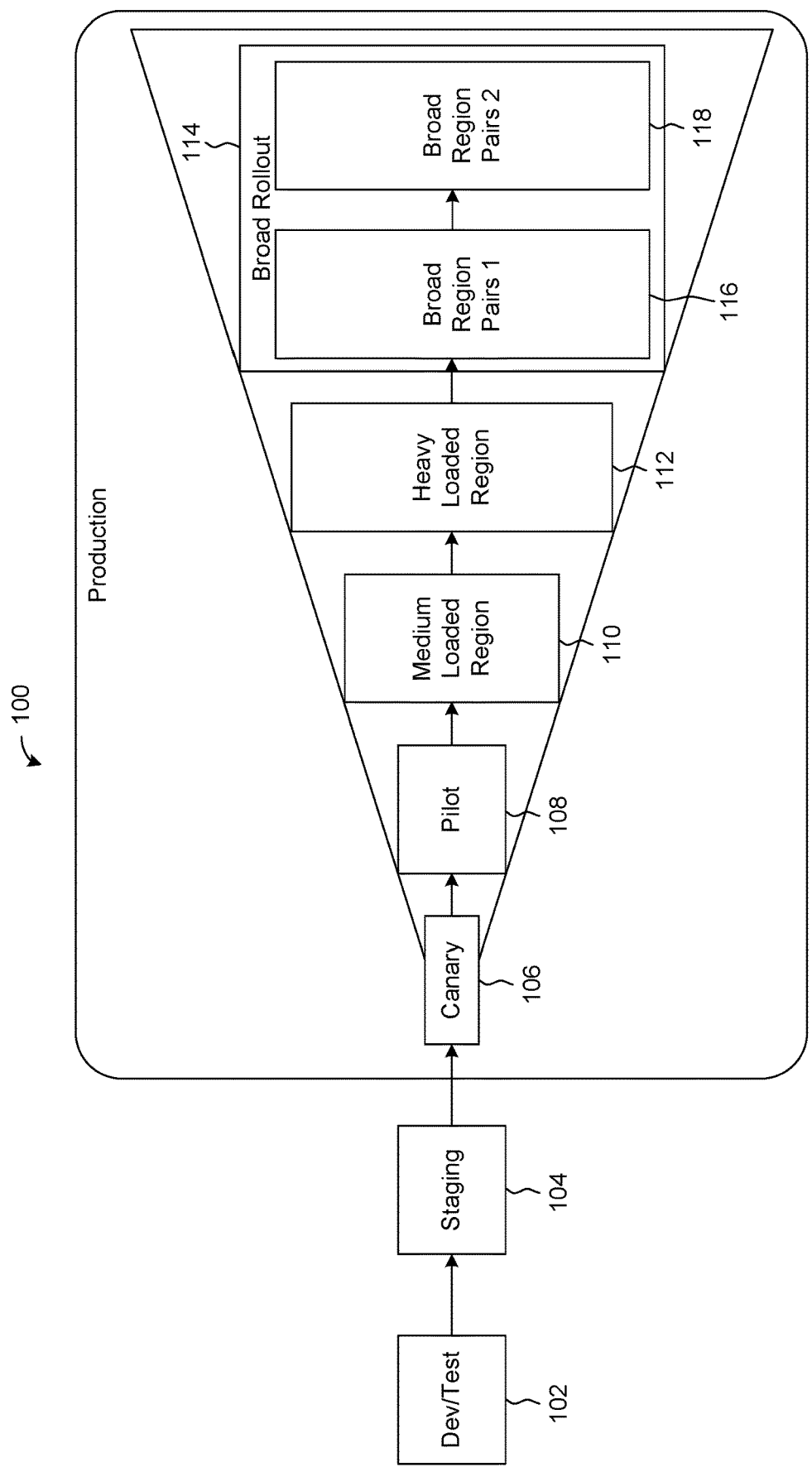
FIG. 1 shows a safe deployment practice framework, which may be used with some implementations of the present concepts.

FIG. 1 shows a safe deployment practice (SDP) framework 100, which may be used with the present concepts. The SDP framework 100 may provide a guideline for developing a cloud deployment plan having multiple phases. The SDP framework 100 may involve phased rollout of the package to incrementally larger number of targets while validating the deployment of the package at various phases.

In one implementation, an update (which may be considered a package or a payload in a deployment context) may be developed and tested at a development and testing phase 102. Next, in a staging phase 104, the update may be tested for its integration and interactions with other components as well as stress-tested for stability, quality, and interoperability, etc. The staging phase 104 may involve rolling out the update to one or more clusters of computers.

Next, the update may be deployed to a canary phase 106, which may include one or more geographic regions that include one or more availability zones (AZs) of clusters. For example, the update may be deployed to 20 clusters in the canary phase 106. In the canary phase 106, the update may be more fully validated and tested for further replication to other geographical regions. The canary phase 106 may be useful for full production-level testing, including testing the update's effects on third party services.

Next, in a pilot phase 108, the update may be deployed to even more clusters with more diversity of hardware, software, and configurations. For example, the update may be deployed to 70 clusters in the pilot phase 108. After the pilot phase 108, the update may be deployed to the remaining clusters in the cloud fleet in multiple phases.

Typically, to minimize risk, the update may be deployed to clusters in geographical regions with light or medium load (i.e., low to medium utilization) before the update is deployed to clusters in geographical regions with heavy load (i.e., high utilization). Subsequently, the update may be deployed more broadly to geographical regions with a much larger number of clusters. Moreover, certain regions of clusters may be paired to serve as redundant backups for each other, especially for high-load regions that are more heavily used and/or more critical. In one example, after the pilot phase 108, the update may be deployed to a medium loaded region 110 and then to a heavy loaded region 112. Furthermore, a broad phase 114 may also be performed to broadly roll out the update incrementally to the remainder of clusters, for example, starting with first broad region pairs 116 and then second broad region pairs 118, and so forth, until the update has been deployed to all target clusters of computers.

The SDP framework 100 illustrated in FIG. 1 is just one example of a multi-phased deployment plan. The present concepts may be applicable in other deployment plans that vary in the number of phases, the names of the phases, the organizational and hierarchical groupings of computers, etc.

The SDP framework 100 may help reduce deployment risks by detecting and correcting errors early, and preventing widespread problems associated with deploying packages to the cloud computing fleet. For instance, bake time (or delay time) may be incorporated in between phases to ensure that deployment to one phase does not exhibit any problems before moving forward to the next phase. These strategies of deploying the update to a small number of low-risk clusters first may reduce the risk of widespread downtimes and other problems experienced by many users. Validations at the early phases can build confidence in the quality of the update. Thereafter, the deployment can progress to a broader set of clusters in later phases. The multiple phases in the SDP framework 100, illustrated in FIG. 1, may be ordered from lowest risk (on the left-hand side of FIG. 1) to highest risk (on the right-hand side of FIG. 1) in terms of user exposure.

In some implementations, planning the deployment may involve determining one or more deployment parameters, such as ordering of the clusters (i.e., which clusters should be deployed to first versus which clusters should be deployed to later), the number of clusters to deploy concurrently (i.e., batch size), completion percentage (i.e., what percentage of clusters in a group should be completed before advancing deployment to the next group), bake time (i.e., how long to wait before advancing deployment to the next group), etc. When determining optimal deployment plans, one or more objectives or goals may be considered. For example, one objective may be to minimize deployment time. The serial nature of deployment can prolong the overall deployment time significantly. Furthermore, the deployment time needed for each cluster can vary a lot from cluster to cluster. Additionally, one exploratory analysis of deployments observed that about 50% of the overall deployment time is often spent on the last 10% of the clusters, resulting in a long tail problem where some parallel resources are deploying to the last clusters while other parallel resources are inefficiently idle. Deployment reports have shown that fast deployment times can potentially be critical when deploying significant security patches. Another objective may be to reduce or minimize risk. Risk in the deployment context may include any degradation in user experience, such as errors, lags, or service interruptions. Thus, minimizing risk may be important for user satisfaction and/or business profits.

In some circumstances, multiple objectives may include tradeoffs. For example, decreasing deployment time may result in increasing deployment risk, and decreasing deployment risk may result in increasing deployment time. If a package is very quickly deployed to many clusters concurrently, then deployment time would be low, but deployment risk would be high. Conversely, if a package is slowly deployed to few clusters at a time and there are long validations in between, then deployment risk would be low, but deployment time would be high. Thus, there may be a tradeoff between time and risk.

Figure 2:
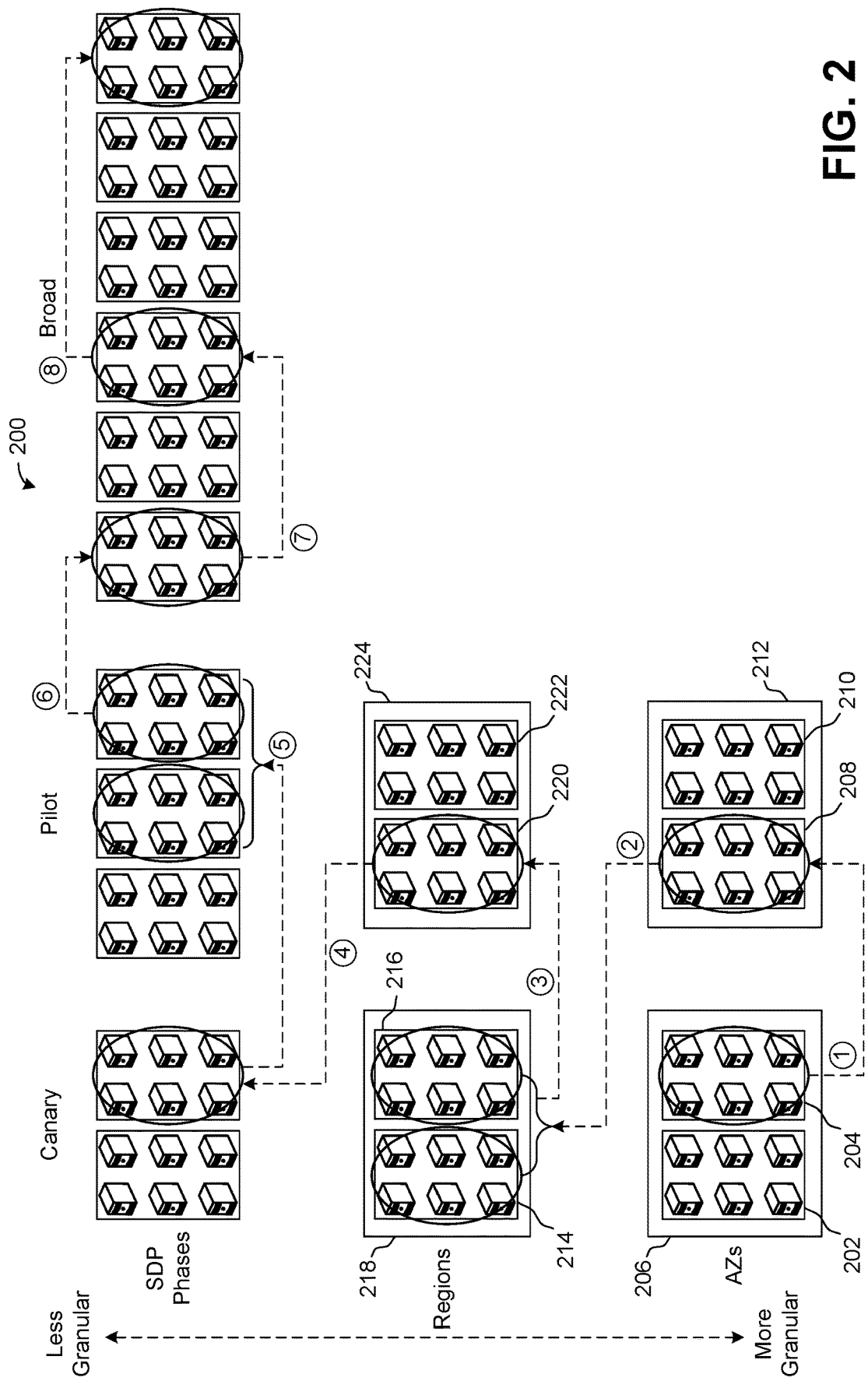
FIG. 2 shows a cloud computing fleet, in which a smart deployment plan, consistent with some implementations of the present concepts, may be implemented.

FIG. 2 shows a cloud computing fleet 200, in which a smart deployment plan, consistent with the present concepts, may be implemented. The cloud computing fleet 200 may include multi-leveled structure. For example, multiple computers in the cloud computing fleet 200 may be grouped into an availability zone (AZ), multiple AZs may be grouped into a region, and multiple regions may be grouped into an SDP phase, such as canary, pilot, and broad. In one scenario, an AZ may represent a data center, and a region may represent a geographical region, such as a continent. Thus, the hierarchy in FIG. 2 shows the least granular level on the top row and the most granular level on the bottom row. The cloud computing fleet 200 illustrated in FIG. 2 may be a simplified depiction that does not show every computer, cluster, AZ, region, and/or SDP phase. That is, to avoid clutter and for the sake of readability, FIG. 2 only shows a limited number of AZs and regions. Specifically, FIG. 2 shows AZ1 202 and AZ2 204 paired as a first AZ pair 206. FIG. 2 shows AZ3 208 and AZ4 210 paired as a second AZ pair 212. The first AZ pair 206 and the second AZ pair 212 are part of Region1 214. FIG. 2 shows Region1 214 and Region2 216 paired as a first region pair 218. FIG. 2 shows Region3 220 and Region4 222 paired as a second region pair 224. The first region pair 218 and the second region pair 224 are part of the canary phase. However, each SDP phase may contain more regions than shown in FIG. 2, each region may contain more AZs than shown in FIG. 2, and each AZ may contain more clusters than shown in FIG. 2.

Furthermore, as demonstrated by this example in FIG. 2, some of the regions and AZs may be grouped in twos (pairs or duos) or threes (trios) or larger numbers, where they redundantly back each other up. For instance, two regions (e.g., US-East and US-West) may be configured to back each other up so that if one fails, then the other takes over. Therefore, deployment plans may be limited or constrained so that not all regions or AZs in a group can be updated concurrently. For example, a deployment plan may deploy an update to only one region in a region pair at a time rather than deploying to both regions in the region pair concurrently, to ensure that there is active backup support for each region during deployment.

The numbered dotted arrows in FIG. 2 may represent a hypothetical sequence of deployment of the circled computers. Although some deployment plans may require 100% completion of an AZ or a region before proceeding to deploy to the next AZ or the next region, other deployment plans may allow advancement to the next AZ or the next region after less than 100% completion. For example, as illustrated in FIG. 2, once 50% of the clusters in the first AZ pair 206 are completed (as indicated by the circled clusters in AZ2 204), deployment may proceed to the second AZ pair 212, as indicated by the dotted arrow labeled "1." However, the example deployment plan illustrated in FIG. 2 may wait until 100% of the clusters in the first region pair 206 are completed (as indicated by the circled clusters in Region1 214 and in Region2 216) before proceeding to the second region pair 224, as indicated by the dotted arrow labeled "3." A different minimum completion percentage constraint may be set for each AZ, region, and/or SDP phase. The clusters that are not circled in FIG. 2 would still be deployed to, but the progression of deployment may not have to wait for those clusters to complete before moving forward with other clusters.

In addition, a concurrency limit (or a maximum batch size) may be another constraint that limits how many clusters, AZs, and/or regions may be concurrently updated together in batches. For example, a batch size limit of one for a particular AZ may constrain the deployment of a payload to one cluster at a time sequentially within that AZ. Similarly, any other deployment parameters may be limited per individual computer or groupings of clusters (e.g., individual AZ, region, and/or SDP phase).

Deployment Planning Problem

As demonstrated through examples above, there may be many variable deployment parameters and constraints (including constraints on such parameters) related to planning deployment. For example, decisions may be made regarding the ordering of clusters, AZs, regions, and/or SDP phases; the limit on the number of concurrent deployments for each cluster, AZ, and/or region; the minimum percentage completion required to proceed for each AZ, region, and/or SDP phase; whether concurrent deployment is permitted based on redundancies; and/or bake time that should elapse before proceeding with next group, etc. Such decisions should advance one or more objectives associated with deployment, such as reducing/minimizing time and/or reducing/minimizing risk.

Historically, deployment parameters have been selected by human judgment and/or randomly, rather than being informed by data or artificial intelligence. That is, there is no systematic intelligence built into the process of planning deployment and no technological solutions for this task. For example, conventionally, human decisions may account for following the SDP framework 100 (proceeding through the staging phase 104, the canary phase 106, the pilot phase 108, and then the broad phase 114) and staying within the bounds of parameter constraints that account for redundancies and batch size limits. However, conventional deployment planning often involves choosing the deployment order of clusters within an AZ randomly, choosing the deployment order of AZs within a region randomly, and choosing the deployment order of regions within an SDP phase randomly. Although manual ordering of target clusters is theoretically possible, such a task is too cumbersome when planning a deployment to thousands of clusters.

Moreover, conventionally, there is no way to automatically and intelligently achieve or even strive for optimal balancing of multiple objectives, such as speed and risk. For example, conventionally, there is no insight into the current state of the cloud fleet when developing a deployment plan. That is, the deployment plan does not take into consideration which clusters are relatively idle (which would have high deployment speed and low deployment risk) and which clusters are relatively busy (which would have low deployment speed and high deployment risk). Furthermore, multiple deployments that take too long can clog up the deployment queue, further delaying subsequent deployments, delaying proper validation of interoperability of multiple updates, delaying time-sensitive fixes of critical security vulnerabilities, and/or potentially endangering the security of the cloud fleet.

Thus, there is a need for a technical solution that enables smart and automated ways to plan deployments such that objectives (such as speed and risk) can be automatically optimized using current status data. Also, it would be desirable if a deployment administrator's preferences for balancing multiple objectives could be automatically factored into orchestrating deployments. For instance, a security team may want to deploy a critical update to all computers in the entire fleet very quickly (e.g., within 5 days) even if doing so is risky. On the other hand, an operating system team may want to deploy a new feature to the entire fleet with minimal risk even if the deployment time takes a long time.

Deployment Planning Solution Summary

The present concepts provide a technical solution that enables a smart automated data-driven systematic approach to determining optimal deployment parameters that advance one or more objectives. A smart deployment system or method, consistent with the present concepts, may use one or more prediction models associated with the one or more objectives. Additionally, a smart deployment system or method, consistent with the present concepts, may use an optimization model to determine optimal parameters for orchestrating deployments. The term "optimal" as used herein does not necessarily mean only the best but can mean more efficient or better than manual determinations.

In some implementations, the prediction models may be rule-based models and/or machine-learning models. For example, a time prediction model (also called a speed prediction model) may be trained to predict a deployment time (i.e., speed) associated with a payload and a cluster, and a risk prediction model may be trained to predict deployment risk associated with a payload and a cluster. These and additional prediction models may predict speed, risk, and additional objectives or factors that may be considered when planning deployment.

The optimization model may use one or more optimization algorithms to find deployment parameters (e.g., the sequence of clusters, completion percentage, batch size, bake time) that optimize the one or more objectives (e.g., speed and risk). In some implementations, the optimization model may be a graph model that builds, for example, a multi-layer, multi-objective graph based on the predictions from the one or more prediction models. Thus, the optimization model may model the deployment planning problem as a graph problem, such as a shortest path graph problem. The optimization model may then use one or more optimization algorithms to find one or more optimal solutions to the shortest path graph problem. In some implementations, an optimization algorithm may find the truly optimal solution(s) to shortest path graph problems. In other implementations, an optimization algorithm may estimate or approximate the optimal solution(s) to shortest path graph problems. In certain scenarios where multiple competing objectives may be balanced, an optimization algorithm may estimate multiple non-dominated solutions along the Pareto front (explained below) in the objective space. By outputting multiple solutions, an administrator may be presented with multiple choices of deployment plans that correspond to the multiple solutions. Then, the administrator may choose one deployment plan that best fits her preferences for the desired objectives, such as the desired levels of speed and risk. In turn, a deployment orchestrator may carry out the preferred deployment plan selected by the administrator to the extent possible.

In some implementations, inputs to the smart deployment system may include a payload (or details about the payload), a set of target clusters (e.g., a list of target clusters and/or their groupings), limits on deployment parameters, and/or limits on objectives (e.g., the maximum deployment time). These inputs may be provided by an administrator and/or from a computer (e.g., the structure of the cloud fleet). In some implementations, outputs from the smart deployment system may include a cluster ordering (e.g., at multiple levels), other deployment parameters (e.g., optimal completion percentage, batch size, bake time), and predicted objective values (e.g., estimated overall deployment time and risk). The outputs from the smart deployment system may be presented to an administrator and/or provided to a computer. For instance, the administrator may select one of multiple deployment plans depending on her desired levels of speed and/or risk. The outputs from the smart deployment system and/or the administrator's selection may be provided to a deployment orchestrator to execute the deployment plan. Therefore, the smart deployment system may augment and/or work together with existing deployment orchestration mechanisms.

Models

The present concepts can provide deployment plan recommendations that are optimal (true optimal, approximately optimal, and/or otherwise preferred) with respect to one or more objectives. Therefore, using prediction models and/or optimization models, the present concepts may enable deployment time reduction and/or deployment risk reduction compared to conventional deployment planning methods. The present concepts may allow an administrator to customize the deployment plan, such as target cluster ordering, bake times, completion percentages at various stages, acceptable deployment time, acceptable deployment risk, concurrent deployments, etc. The present concepts further allow for early detection of problems while minimizing end user exposure to such problems.

Figure 3:
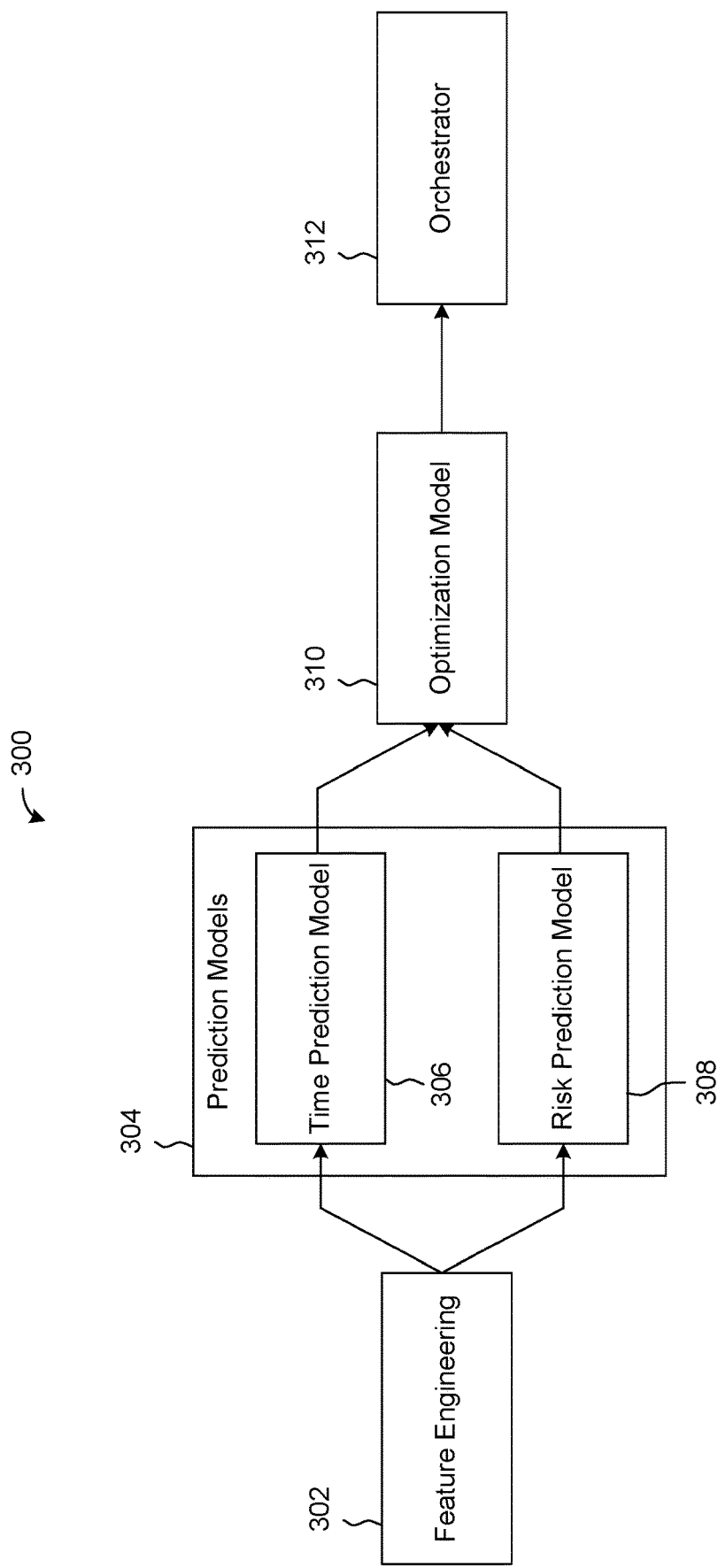
FIG. 3 shows a block diagram a smart deployment system, consistent with some implementations of the present concepts.

FIG. 3 shows a block diagram of a smart deployment system 300, consistent with the present concepts. In some implementations, the smart deployment system 300 may include a feature engineering module 302. The feature engineering module 302 may collect and/or receive input data from one or more data sources. For example, input data may include the type of machines in various clusters, geographical locations of clusters, the number of computers in clusters, the kind of payload (e.g., security patch, network update), the size of payload, networking capacity of clusters, current usage of clusters, capabilities of clusters (e.g., processor speed), etc. The feature engineering module 302 may receive the data, clean the data, curate the data, and format the data into a data format and structure that can be fed into prediction models 304.

In some implementations, the smart deployment system 300 may include one or more prediction models 304 that can predict one or more objectives associated with deployment. For example, in some implementations, the prediction models 304 may include two machine-learning models: a time prediction model 306 and a risk prediction model 308 for predicting speed and risk, respectively, based on historical data. Although FIG. 3 illustrates two prediction models, in alternative implementations, one prediction model may predict both time and risk by using both time prediction functions and risk prediction functions. In some implementations, the prediction models 304 may be multi-class hierarchical models (e.g., a combination of classification and regression). In one implementation, the prediction models 304 may use a gradient boosting algorithm, such as XGBoost. Alternatively, other predictive machine-learning models or techniques may be used.

The time prediction model 306 may be trained using historical data from the feature engineering module 302 to predict estimated deployment time for a given payload and for a given cluster or for a group of clusters. For instance, the time prediction model 306 may learn that a payload of a certain size and of a certain type would take a certain estimated time to deploy on a certain cluster of a specific number of computers of a certain machine type having a certain usage status based on historical data of similar deployments in the past.

In some implementations, deployment time may be defined as the time needed to complete deployment on all target clusters. Deployment time may be a function of at least deployment parameters and deployment constraints, and thus may be formulated as follows:

$$\text{deployment time} = f(\text{parameters}, \text{constraints})$$

The deployment parameters that the time prediction model 306 considers may include, but are not limited to, one or more of the following:

1) A completion percentage for each SDP phase, region, and AZ before moving onto the next.
2) A bake time for each SDP phase, region, and AZ before moving onto the next.
3) A number of failures allowed before ceasing the deployment.
4) A batch size within each AZ and region.
5) A priority level of the deployment.
6) A deployment health evaluation time.

The deployment constraints that the time prediction model 306 considers may include any limitations on the deployment parameters, and may also include, but are not limited to, one or more of the following:

1) The SDP framework that includes an ordering of phases.
2) The deployment queue time, where the present deployment may contend with other deployments in the queue for the target clusters, which may be a popular target for deployments. The queue time may affect the overall deployment time.
3) The deployment time for a cluster, which may be affected by the deployment life cycle (including deployment initiation, approval, queueing, and rollout), the number of nodes or computers in the cluster, the fault domain (i.e., the set of resources that may be affected by a fault caused during deployment), the virtual machines in the cluster, the hardware machines in the cluster, etc.

Similarly, the risk prediction model 308 may be trained using historical data from the feature engineering module 302 to predict the estimated risk for a given payload and for a given cluster or a group of clusters. For instance, the risk prediction model 308 may learn that a payload of a certain size and of a certain type carries a certain level of risk to deploy on a certain cluster of a specific number of computers of a certain machine type having a certain usage status based on historical data of similar deployments in the past.

In one implementation, deployment risk may be quantified in terms of annual interruption rate (AIR). In another implementation, risk may be measured by the number of virtual machines that rebooted due to a crash, failure, and/or error resulting from the deployment. Other measurements of risk, such as the duration of downtimes, as well as combinations of different measurements of risk, may alternatively or additionally be used.

For instance, risk may be defined as an expected value of change in AIR. The estimation of change in AIR may be represented as a distribution, and the expected value may be used as the estimated risk value.

In some implementations, risk may be a function of at least features and deployment parameters, and thus may be formulated as follows:

$$\text{risk} = f(\text{features}, \text{deployment parameters})$$

The risk prediction model 308 may consider one or more deployment parameters, such as those described above with respect to the time prediction model 306. The features that the risk prediction model 308 considers may include, but are not limited to, one or more of the following:

1) Characteristics of the payload.
2) Characteristics of the target clusters, such as the number of computer nodes in the cluster; the number of virtual machines in the cluster; the type of machines; the type of operating system; and the availability zone, the region, and the SDP phase that the cluster belongs to.
3) Saturation or coverage rate, which may include the percentage of hardware machines of a particular type (e.g., manufacturer, model, and configuration of machines) the rollout has already deployed to out of the total hardware machines of that particular type present in a target cluster. For example, if a rollout is targeting a particular cluster with three hardware machines of a certain type and the payload has been deployed to two of the three machines, then the saturation rate for this cluster would be ⅔ or 67%. Deployments can react differently to different types of hardware machines. The risk prediction model 308 may consider the historical results of past deployments to certain types of machines.
4) Risk history of the team that developed and is deploying the payload, e.g., the historical AIR impact from previous rollouts created by the team.
5) The risk performance of the current rollout of the payload, such as node failures caused by the current rollout. For example, if the current rollout has already deployed to 100 clusters so far, the AIR impact to those earlier 100 clusters can be used as features to predict the potential AIR impact to later clusters remaining as targets in the current rollout by analyzing the causes of faults and similarities between the earlier clusters and the later clusters.

The above listed features as well as additional features previously discussed may be processed by the feature engineering module 302. The features may be measured and/or estimated. Furthermore, one or more of these features may be manually inputted or manually adjusted, for example, to account for special conditions, such as clusters serving sensitive users.

Furthermore, in some implementations, the risk prediction model 308 may be customizable to predict certain kinds of risk. For instance, the kinds of risk associated with networking updates may be different from the kinds of risk associated with security updates, and different from the kinds of risk associated with operating system updates. Therefore, the risk prediction model 308 may present a selection of different types of risk for an administrator to choose from, depending on the types of risk that the administrator wants to predict. Additionally or alternatively, the risk prediction model 308 may include a customizer module that may enable an administrator to onboard risk scores, risk-related features, risk-related formulas, etc.

In some implementations, the prediction models 304 may be retrained on a particular cadence (e.g., every 1 hour, 6 hours, 12 hours, 1 day, 3 days) to take account of the latest input data from the feature engineering module 302, such that the prediction models 304 reflect the current state of the cloud computing fleet. For example, one cluster may be working on an intensive process and experiencing high utilization, such that time and risk associated with deploying to this cluster would be high. Thus, it may be advantageous to avoid deploying to this cluster for now, if possible, and instead deploy to a different cluster that is relatively idle and thus currently has high speed and low risk associated with it for deployment.

Any suitable period may be chosen for retraining the prediction models 304, such as every hour, every day, etc. Alternatively, retraining may be performed on demand and/or as needed as a certain amount of new input data becomes available to be processed by the feature engineering module 302. As more deployments occur and thus more historical data are analyzed by the prediction models 304, these machine-learning models can more accurately predict speed and risk associated with future deployments. That is, the prediction models 304 may learn which payloads and which clusters are high speed from past fast deployments, learn which payloads and which clusters are payloads are low speed from past slow deployments, learn which payloads and which clusters are low risk from past deployment successes, and learn which payloads and which clusters are high risk from past deployment failures. Such machine learning may enable the prediction models 304 to accurately estimate speed and risk associated with future deployment plans.

In some implementations, accuracy metrics may be tracked for the prediction models 304. For example, the actual deployment time may be measured and compared with the predicted deployment time to calculate a time prediction error. Similarly, the actual deployment risk may be measured and compared with the predicted deployment risk to calculate a risk prediction error. These time and risk prediction errors may be calculated for each cluster, AZ, region, and/or SDP phase. Furthermore, the errors may be fed into the prediction models 304 to adjust and improve the machine-learning models to make more accurate predictions in the future. In some implementations, the accuracy of the prediction models 304 may depend on the quality of the input data. Thus, the errors may help identify additional input data or better input data that should be gathered for the feature engineering module 302 and/or the prediction models 304 to improve prediction accuracy of the prediction models 304.

The smart deployment system 300 may include an optimization model 310. The outputs from the prediction models 304 may be used as inputs to the optimization model 310. The optimization model 310 may find one or more optimal solutions to deployment planning problems by tackling multiple objectives (e.g., speed and risk). In some implementations, the optimization model 310 may be a graph model that uses a graph-based algorithm to solve a graph problem derived from a deployment planning problem.

The optimization model 310 may output one or more deployment plan recommendations. A deployment plan recommendation may include, for example, an optimal sequence of clusters and/or optimal deployment parameters. The output sequence of clusters may include the recommended deployment order of clusters for each AZ, each region, and each SDP phase that are included in the overall target for the deployment. The output deployment parameters may include, for example, a recommended completion percentage, a recommended bake time, recommended batch size, etc., for each AZ, region, and/or SDP phase, where applicable. The output may further include expected overall deployment time (total completion time for deployment to all target clusters) and expected overall deployment risk (total level of impact on AIR). In some implementations, the output may include breakdown of deployment times and deployment risks for various clusters, AZs, regions, and SDP phases individually.

The smart deployment system 300 may include or operate with a deployment orchestrator 312. The deployment orchestrator 312 may apply and execute the deployment plan output by the optimization model 310 and/or selected by an administrator. Thus, the smart deployment system 300 can work with existing conventional deployment orchestrators. Existing deployment orchestration mechanisms may be augmented with artificial intelligence-based optimization, consistent with present concepts, to achieve faster and safer deployments to cloud computing fleets.

Workflow

Figure 4:
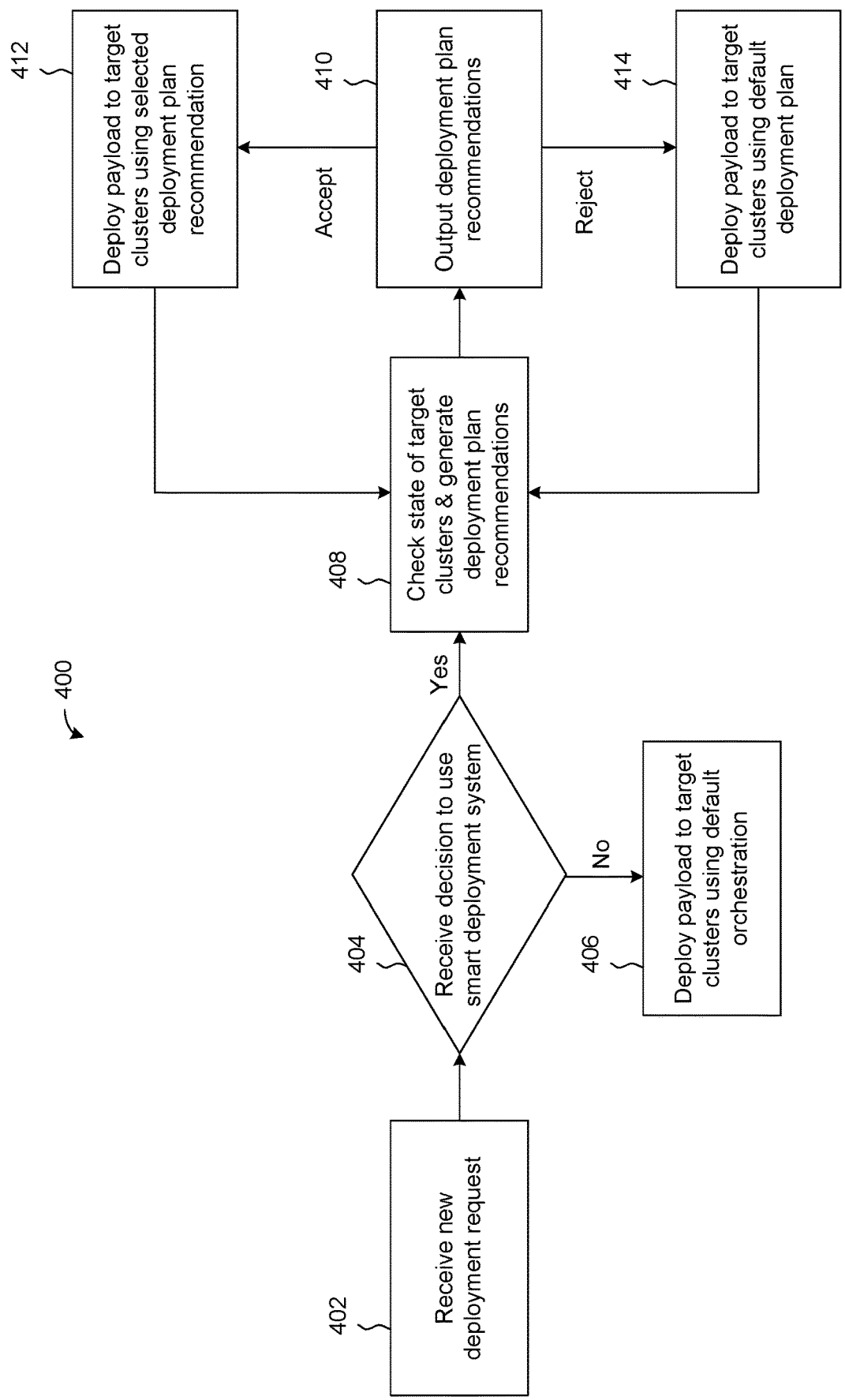
FIG. 4 shows a diagram of a smart deployment workflow, consistent with some implementations of the present concepts.

FIG. 4 shows a diagram of a smart deployment workflow 400, consistent with the present concepts. In box 402, a new deployment request may be received by a deployment platform from a developer of a payload. The new deployment request may include deployment information, such as details about the payload, identification of the target clusters, and any deployment parameter constraints.

In decision box 404, a decision by a deployment administrator on whether to use a smart deployment system, consistent with the present concepts, may be received by the deployment platform. If the administrator opts not to use a smart deployment system, then in box 406, the payload may be deployed to the target clusters using default orchestration rather than the smart deployment system.

If the administrator opts to use a smart deployment system, then in box 408, the deployment platform may check the current state of the target clusters and/or use the smart deployment system to generate at least one deployment plan recommendation. As described above, the smart deployment system may run machine-learning prediction models that can predict one or more objectives (such as speed and/or risk) associated with the payload and the target clusters. The smart deployment system may also run an optimization model to find one or more deployment plan recommendations.

In box 410, the deployment platform may output the one or more deployment plan recommendations. In one implementation, the administrator may review the deployment plan recommendation, and either accept or reject the deployment plan recommendation output by the deployment platform. Alternatively, the administrator may review multiple deployment plan recommendations, and select one of the multiple deployment plan recommendations, for example, depending on the preferred levels of speed and risk. For instance, if the administrator prefers to quickly deploy a critical update to the entire fleet as soon as possible, she may select a deployment plan recommendation that is high speed even if it is also high risk. Additionally or alternatively, an automated set of rules may be applied to accept, select, or reject one or more deployment plan recommendations.

In box 412, the accepted or selected deployment plan may be executed to roll out the payload to the intended target clusters. In box 414, the deployment plan recommendation may be rejected either by the administrator or by automated rules. For example, the developer and/or the administrator may have requested a deployment time that cannot be achieved given the deployment constraints and the current state of the target clusters. In such a scenario, the deployment platform may inform the developer and/or the administrator to change her expectations. Alternatively, a default deployment plan may be implemented by the orchestrator without using the deployment plan recommendations generated by the smart deployment system.

In some implementations, the entire deployment (i.e., to all target clusters) may not be planned at once but rather in stages. For example, the smart deployment system may generate deployment plan recommendations for the clusters in one availability zone, one region, or one SDP phase. After the administrator reviews the recommendations for the particular stage of the deployment plan and the selected plan is executed, the current state of the clusters may be checked (box 408), and additional deployment plan recommendations may be generated for the next stage of deployment (box 410). And this process loop may repeat (e.g., from AZ to AZ, region to region, and/or SDP phase to SDP phase) until the entire deployment is completed. Thus, the smart deployment workflow 400 may form loops that iterate through the multiple AZs, regions, and/or SDP phases to complete the entire deployment to all target clusters, allowing the administrator to validate the payload and select one or more stages of a deployment plan on an ongoing basis throughout the deployment.

Cloud Computing Fleet

Figure 5:
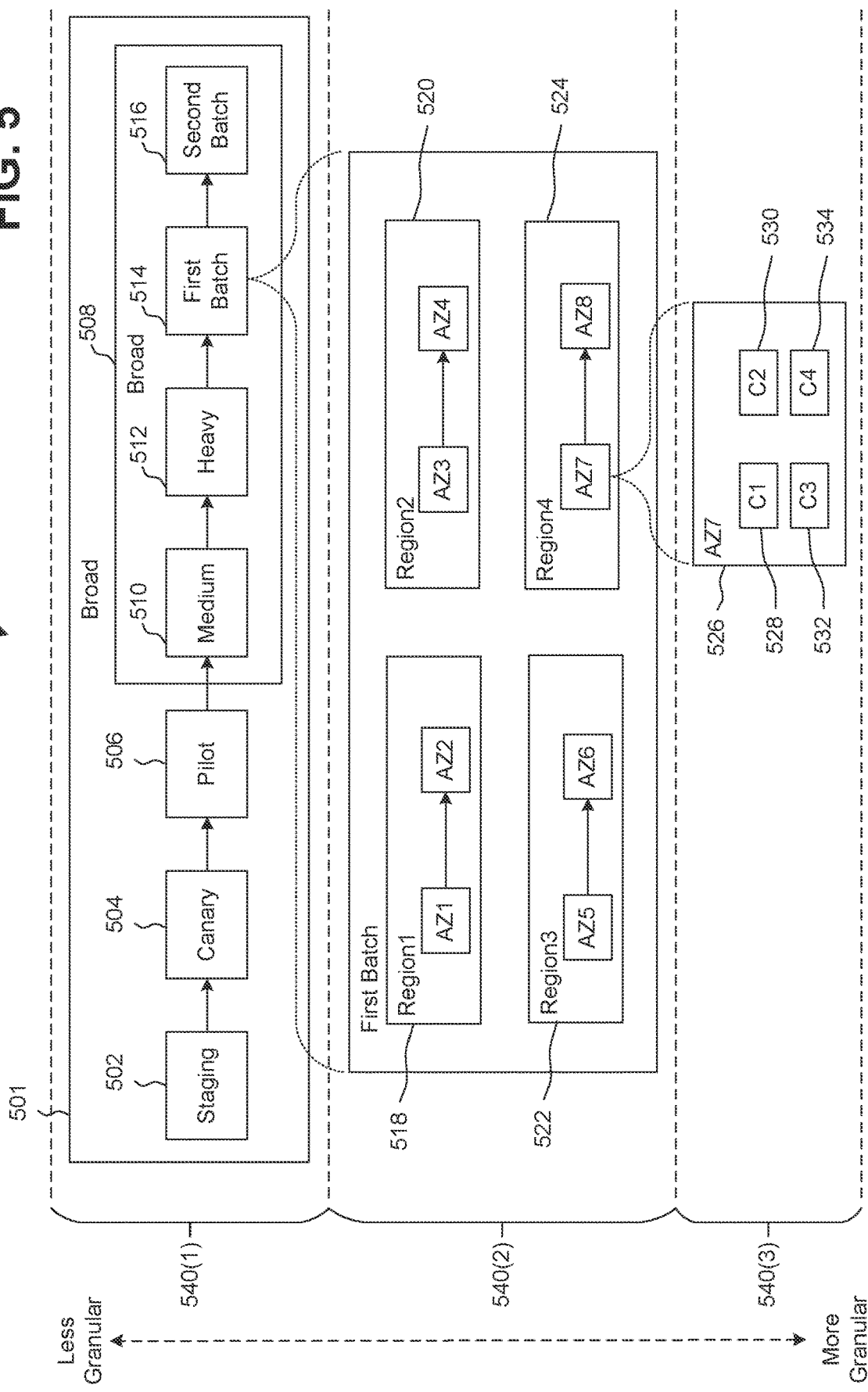
FIG. 5 shows a cloud computing fleet, in which some implementations of the present concepts may be implemented.

FIG. 5 shows a cloud computing fleet 500, in which the present concepts may be implemented. The cloud computing fleet 500 is just one example fleet that is described to illustrate the present concepts. Other fleets can be used as well. In some implementations, the target clusters for deployment may be hierarchically arranged in multiple levels 540. The example illustrated in FIG. 5 shows that the clusters in the cloud computing fleet 500 are organized into a top level 540(1), a middle level 540(2), and a bottom level 540(3), in order of least granular to the most granular.

The top level 540(1) in the cloud computing fleet 500 may include multiple SDP phases 501, for example, a staging phase 502, a canary phase 504, a pilot phase 506, and a broad phase 508. One or more of these phases may be further broken down into multiple subphases for deployment. For example, the broad phase 508 may include a medium loaded subphase 510, a heavy loaded subphase 512, a first batch subphase 514, and a second batch subphase 516.

In some implementations, a deployment may proceed by deploying a payload to each of these phases and subphases in sequential order (from left to right in FIG. 5). Generally, a deployment may start with earlier phases that contain sets of fewer clusters and/or lower-risk clusters, and then progressively advance to later phases that contain sets of many clusters and/or higher-risk clusters. For example, the staging phase 502 may have five clusters with no production workload, and thus have low deployment risk, whereas the broad phase 508 may have thousands of clusters with end-user production workload, and thus have higher deployment risk.

In some implementations, a bake time may be added between each phase and/or subphase of deployment. For instance, the bake time may allow the administrator to check the status of deployment to a current phase(s) and observe the impact of the payload before continuing with deployment to the subsequent phases. If a problem or error is detected during bake time, the deployment may be halted, and the problem or error can be addressed rather than spreading it to a broader base of clusters.

In some implementations, to address the long tail deployment time issue mentioned above, rather than waiting until the current phase is 100% complete before moving on to the next phase, the deployment may progress to the next phase when a certain percentage of the current phase is complete. The remainder of the current phase may still continue (e.g., in the background) but would not hold up the deployment from advancing to the next phase. The SDP phase completion percentage may be computed as follows:

$$\frac{\text{\# of clusters completed in this SDP phase}}{\text{total \# of target clusters in this SDP phase}}$$

Alternatively, the SDP phase completion percentage may be computed based on the number of completed versus total regions or AZs rather than clusters. Therefore, the deployment parameters in this top level 540(1) may include an SDP phase completion percentage and an SDP phase bake time. These deployment parameters may be constrained (e.g., maximum or minimum limits) by the administrator and/or optimized by the optimization model.

The middle level 540(2) in the cloud computing fleet 500 may include regions. In some implementations, one or more of the SDP phases (or subphases) may include one or more regions. To avoid clutter on the drawing sheet, FIG. 5 shows only Region1 518, Region2 520, Region3 522, and Region4 524 inside the first batch subphase 514. The deployment ordering of the regions may be optimized. Some of the regions may be deployed concurrently, i.e., in parallel, in batches. The total number of regions that may be deployed at the same time may be limited by a maximum batch size. A batch size may refer to the how many concurrent deployments are allowed at the same time.

Some of the regions may be paired into region pairs or grouped into trios or larger groups. Such grouped regions may be redundant backups for one another. For example, if the US-East region and US-West region back each other up, then those two regions may not be deployed concurrently so as to avoid the risk of both regions failing at the same time. For these grouped regions, deployment may proceed serially rather than in parallel, or at least not all of the regions in a group may be deployed at the same time.

Similar to the SDP phase, deployment may pause for a certain bake time between each region, if so desired, to give time for evaluation of the status of the deployment before allowing it to progress further. In other implementations, deployment to regions within an SDP phase may proceed without any bake time.

Similar to the SDP phases, a deployment may advance to the next region when the completion level for the current region reaches a certain percentage rather than waiting until the current region completes 100%. The region completion percentage may be computed as follows:

$$\frac{\text{\# of clusters completed in this region}}{\text{total \# of target clusters in this region}}$$

Alternatively, the region completion percentage may be a ratio based on the number of completed versus total AZs. Therefore, the deployment parameters in this middle level 540(2) may include a deployment ordering of the regions, a region completion percentage, a region batch size, and a region bake time. These deployment parameters may be constrained by the administrator and/or optimized by the optimization model.

The bottom level 540(3) in the cloud computing fleet 500 may include AZs. In some implementations, one or more of the regions may include one or more AZs. To reduce cluster on the drawing sheet, FIG. 2 only shows AZ7 526 inside Region4 524, and only shows four clusters (C1 528, C2 530, C3 532, and C4 534) inside AZ7 526. However, additional clusters and additional regions that are not illustrated in FIG. 2 may be included in the cloud computing fleet 500. Some of the AZs in a region may be deployed concurrently, i.e., in parallel, in batches. Some regions may be small, e.g., with only one to five AZs, whereas other regions may be large, e.g., with hundreds of AZs. The small number of AZs in a small region may be deployed to concurrently, but deploying to all AZs in a very large region may be inadvisable due to higher risk. The total number of AZs that may be deployed to at the same time may be limited by a maximum AZ batch size. The deployment ordering of the AZs and/or the AZ batch size may be optimized.

Some of the AZs may be grouped in twos or threes or larger numbers. Such grouped AZs may be redundant backups for one another. For these grouped AZs, deployment may proceed serially rather than in parallel, or at least not all of the AZs in a group may be deployed at the same time.

Similar to the SDP phase, deployment may pause for a certain bake time between each AZ, if so desired, to give time for evaluation of the status of the deployment before allowing it to progress. In other implementations, deployment to AZs within a region may proceed without any bake time.

Similar to the regions, a deployment may advance to the next AZ when the completion level for the current AZ reaches a certain percentage rather than waiting until the current availability zone completes 100%. The availability zone completion percentage may be computed as follows:

$$\frac{\text{\# of clusters completed in this AZ}}{\text{total \# of target clusters in this AZ}}$$

Therefore, the deployment parameters in this bottom level 540(3) may include a deployment ordering of the AZs, an AZ completion percentage, an AZ batch size, and an AZ bake time. These deployment parameters may be constrained by the administrator and/or optimized by the optimization model.

In some implementations, the optimization model may start by optimizing at the most granular level, such as the AZ level or the bottom level 540(3) in this example, and then progressively move up to less granular levels, such as the region level and then the SDP phase level. The optimization model may take into account the redundancies, maximum batch sizes, minimum bake times, minimum completion percentages, and any other constraints imposed on the deployment plans.

For example, an administrator may specify a maximum batch size of 100 clusters, such that the optimization model may find an optimal batch size (e.g., 40 clusters) for a particular AZ and find another optimal batch size (e.g., 30 clusters) for another AZ, each within the 100-cluster limit. As another example, an administrator may specify a minimum percentage completion of 50% as another constraint, such that the optimization model may find an optimal completion percentage (e.g., 80%) before moving onto the next deployment. There may be one or more deployment parameter constraints at every cluster, every AZ, every region, every SDP phase, every level, overall fleet, etc. Thus, the optimization model may be a multi-layer, multi-objective, constrained optimization model.

As described above, a group of nodes or machines may form a cluster. A group of clusters may form an availability zone. A group of availability zones may form a region. A group of availability zones may form an SDP phase. And a group of SDP phases may constitute the entire fleet (or at least the entire targeted clusters within the fleet). Other hierarchical structures (e.g., with different names and/or different numbers of levels) are contemplated as well. Furthermore, although the present concepts are described as orchestrating deployment at the cluster level, it is possible to orchestrate deployment at the computer node level or any other level (e.g., application level, service level, AZ level).

The optimization model may find deployment parameters that optimize over the multiple objectives at multiple layers, from most granular layer to the least granular layer. The layers in the optimization model may correspond to the levels in the cluster structure. Thus, the nested, parent-child relationship of clusters in the deployment structure may add multiple layers to the optimization problem.

Graph Problem

Consistent with some implementations of the present concepts, the optimization model may represent the deployment planning problem as a multi-layer, multi-objective graph problem. The optimization model may generate different graphs at the different layers, from the most granular layer to the least granular layer. In some implementations, the deployment optimization problem may be modeled as a shortest path directed graph problem and the goal may be to find the shortest path in the graph. For example, the optimization model may start by creating different sequences of target clusters in an AZ to generate a graph.

Figure 6:
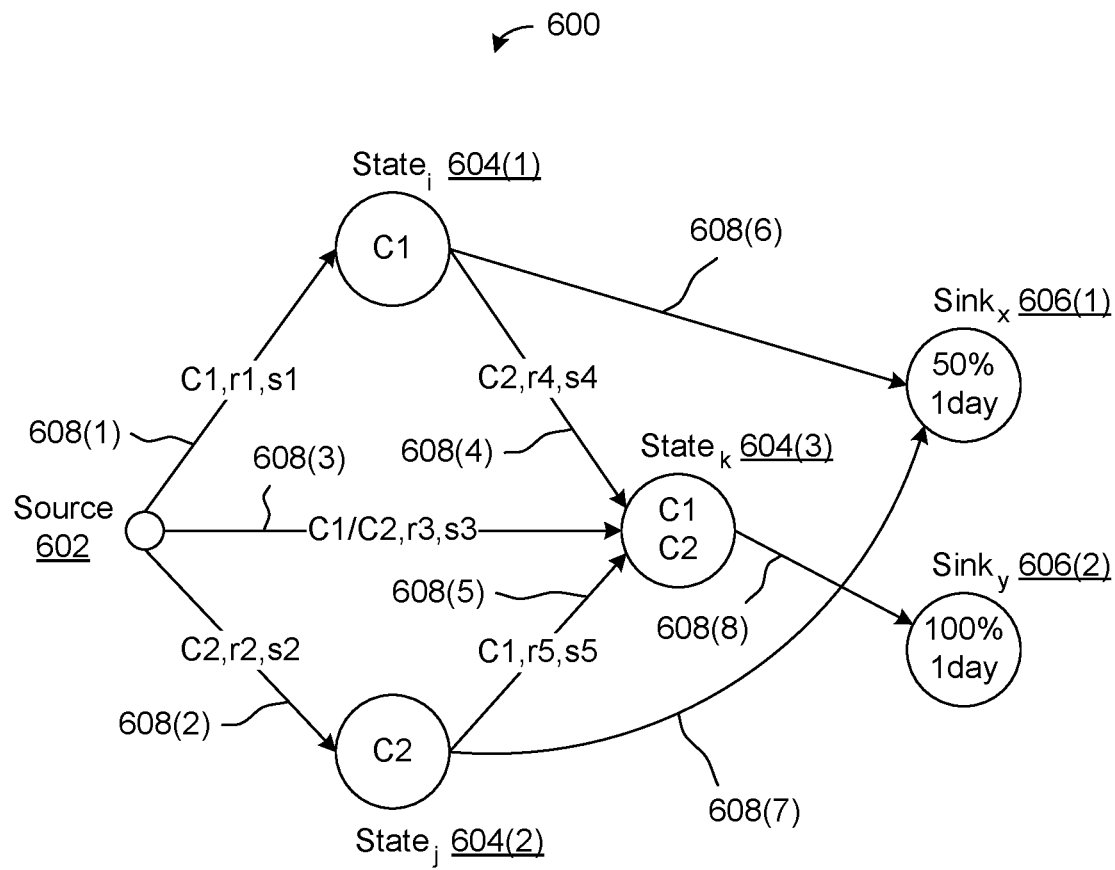
FIG. 6. shows a graph, consistent with some implementations of the present concepts.

FIG. 6. shows a graph 600, consistent with the present concepts. The graph 600 is a very simplified example that helps illustrate the present concepts using a miniature deployment planning problem for an AZ having only two clusters.

The graph 600 may include a source vertex 602 as the starting point of the multiple paths that are possible in the graph 600. The source vertex 602 may be a starting vertex that is empty, i.e., no clusters have been deployed to at this point.

The graph 600 may include one or more state vertices 604. Each state vertex 604 may represent a set of completed clusters (i.e., clusters to which the payload has been deployed up to that state). In this simplified example, the AZ may include two clusters C1 and C2. Accordingly, the graph 600 may include three state vertices: State_i vertex 604(1) for deploying first to cluster C1 only, State_j vertex 604(2) for deploying first to cluster C2 only, and State_k vertex 604(3) for having deployed to both clusters C1 and C2 (either sequentially or concurrent, depending on the path).

The graph 600 may include one or more sink vertices (Sink_x 606(1) and Sink_y 606(2)) as ending points of the multiple paths that are possible in graph 600. Each sink vertex 606 may represent a termination vertex for the AZ. Each sink vertex 606 may include a completion percentage for the AZ and/or a bake time.

The graph may include one or more directed edges 608 connecting the vertices. In one implementation, each edge (608(1)-608(5)) leading to a state vertex 604 may include three types of information: (1) a deployment action, i.e., a set of clusters being deployed to, from the previous state to the next state, (2) a predicted time associated with the deployment action, and (3) a predicted risk associated with the deployment action.

A deployment action may include one or more clusters that are being simultaneously deployed to. A predicted time value may be a duration of time that a time prediction model estimates it will take to deploy to the one or more clusters associated with the deployment action. Where multiple clusters are simultaneously deployed to, the predicted time value may be an aggregate (e.g., the sum, the maximum, the average, or any other formula) of the predicted times for deploying to the individual clusters. In one implementation, the predicted time value may be a positive value measured in any applicable time units, such as seconds, minutes, hours, days, etc. For example, the time prediction model may estimate s1 minutes to deploy to cluster C1, s2 minutes to deploy to cluster C2, and s3 minutes to concurrently deploy to both clusters C1 and C2.

A predicted risk value may be, for example, a risk metric estimated by a risk prediction model for deploying to the one or more clusters associated with the deployment action. Where multiple clusters are simultaneously deployed to, the predicted risk value may be an aggregate (e.g., the sum, the maximum, the average, a weighted sum, or any other formula) of the predicted risk values for deploying to the individual clusters. In one implementation, the predicted risk value may be measured in any applicable risk metrics and units, such as AIR, percentage downtime, number of reboots, duration of downtime, uptime availability percentage, user satisfaction score, etc. In some implementations, the risk value may be calculated using a function based on one or more of these risk metrics. The predicted risk value may be negative where the payload improves AIR. In the example illustrated in FIG. 6, the risk prediction model may estimate a risk value of r1 to deploy to cluster C1, a risk value of r2 to deploy to cluster C2, and a risk value of r3 to concurrently deploy to both clusters C1 and C2.

The predicted time values and/or the predicted risk values assigned to the edges may be derived from the prediction models, discussed above, based on applicable features, deployment parameters, and/or the current status of the fleet. Thus, an edge that terminates at a state vertex may represent a transition from one state to another state by having executed the associated deployment action. Other edges may lead from a state vertex to a sink vertex. An edge that leads to a sink vertex may not include a deployment action. Such an edge may still include a predicted time value and/or a predicted risk value associated with different completion percentages and/or different bake times assigned to the sink vertex.

In some implementations, a source vertex may be connected by an edge to any state vertex. Furthermore, an edge may connect any State_a vertex to any State_b vertex so long as the set of clusters in State_b is a superset of the set of clusters in State_a. Additionally, a state vertex may be connected by an edge to a sink vertex so long as the set of clusters included in the state vertex equals or exceeds the completion percentage in the sink vertex. In one implementation, each state vertex may be connected by an edge to at most one sink vertex having the highest completion percentage that the state vertex satisfies among one or more sink vertices in the graph. For example, in FIG. 6, State_k vertex is connected only to Sink_y vertex of 100% but not to Sink_x vertex of 50%.

Therefore, the graph 600 is a simple example that models an AZ with only two clusters C1 and C2. The possible orders of clusters for deployment are (1) C1-C2, (2) C2-C1, and (3) C1/C2, where the hyphen separates sequential deployments and the forward slash represents concurrent deployments. Here, the batch size may be one or two. Furthermore, the completion percentage may be 50% or 100% (represented by the two sink vertices in the graph 600) before the deployment advances to the next AZ of clusters. Although modeled in the simplified example of the graph 600, the graph 600 may also account for different bake times (e.g., none, 6 hours, 1 day, 3 days). For example, the different bake time parameters may be modeled by different sink vertices that include different bake time values (either separately or together with different completion percentage values).

As explained above, one or more deployment parameters may have constraints, and the graph 600 may reflect those constraints. For example, the batch size may limit the maximum number of clusters that can be deployed together as modeled by the deployment actions associated with edges. For example, if the maximum batch size is five, then no edge in the graph may include more than five clusters. Additionally, if the minimum completion percentage is 70%, then no sink vertex in the graph may include a completion percentage value less than 70%. Similarly, if the minimum bake time is two days, then no sink vertex in the graph may include a bake time value that is less than two days.

As illustrated by this example, the deployment planning problem may be modeled by a graph that includes different paths representing different ordering of clusters, different batch sizes, different completion percentages, and/or different bake times. Although not illustrated in FIG. 6, other deployment parameters may be modeled by a graph. The graph may account for any limits or constraints placed on the acceptable ranges of these parameters that may have been specified by the administrator, policies, best practices, and/or existing physical limitations.

The overall deployment time for a particular path may be an aggregate (e.g., sum) of the predicted time values associated with the edges along the path. Similarly, the overall deployment risk for a particular path may be an aggregate of the predicted risk values associated with the edges along the path. Thus, the shortest path in the graph that completes all of the target clusters, i.e., the optimal path that minimizes the overall deployment time and the overall risk, would represent the optimal deployment plan for this AZ.

Furthermore, multiple graphs may be aggregated and simplified to generate graphs at multiple layers that encompass the entirety of the target clusters. In one implementation, a graph, similar to the example in FIG. 6, may be generated for another AZ of clusters, and so on, until a graph has been generated for all target AZs in a region. Then, the multiple graphs of AZs may be connected together to model multiple deployment options across the multiple AZs in the region. Similarly, for the next less granular layer, multiple graphs may be generated to model multiple regions in an SDP phase, and then connected together to model multiple deployment options across the multiple regions in the SDP phase. Again, at the next less granular layer, multiple graphs that model multiple SDP phases may be connected together.

Figure 7:
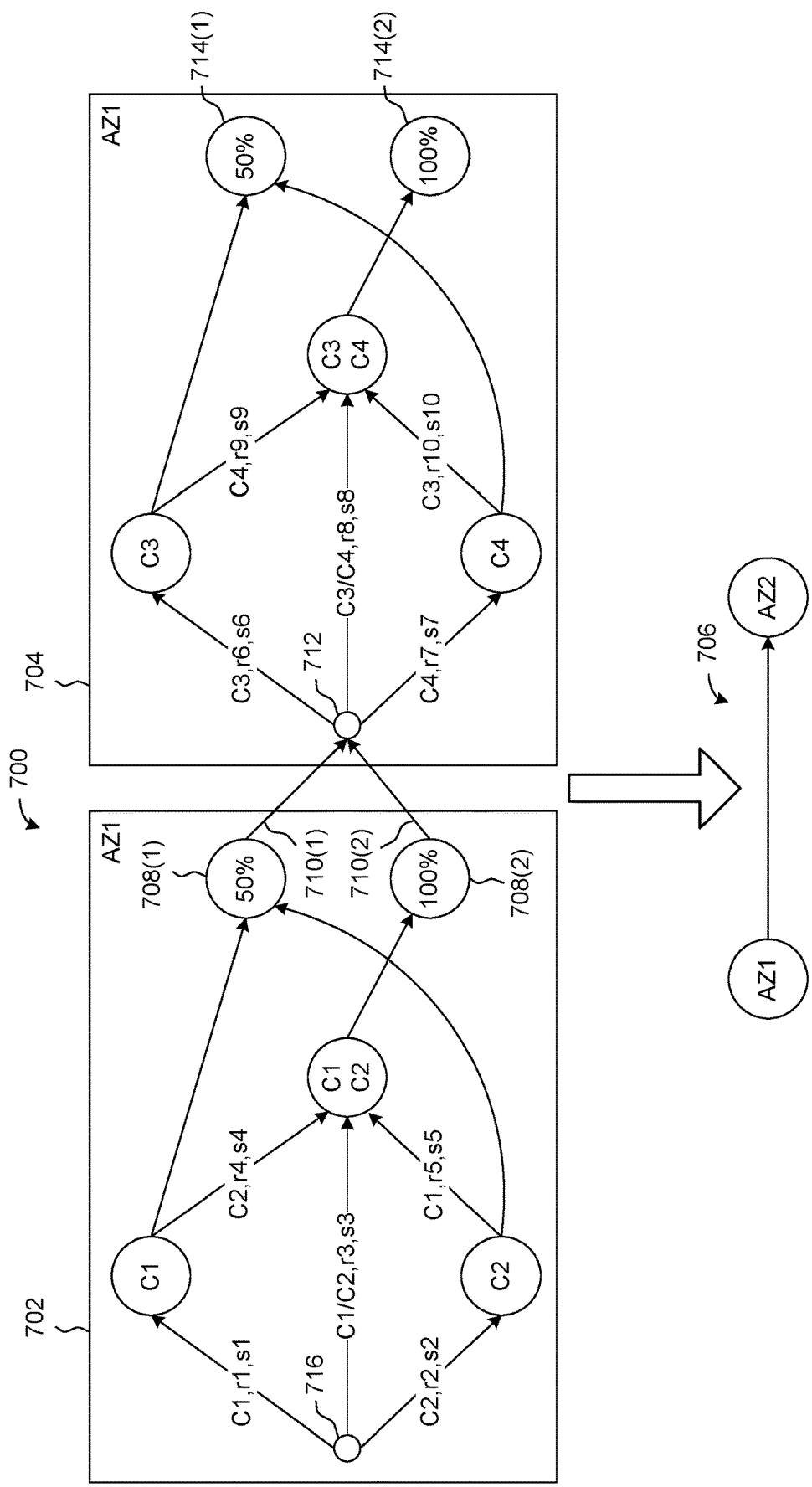
FIG. 7 shows an aggregated graph, consistent with some implementations of the present concepts.

FIG. 7 shows an aggregated graph 700, consistent with the present concepts. In FIG. 7, a graph 702 may model Availability Zone 1 (AZ1), and a graph 704 may model Availability Zone 2 (AZ2). The graph 702 and the graph 704 may be connected together to build the aggregate graph 700 that models a transition between Availability Zone 1 and Availability Zone 2.

First, every sink vertex 708 in the graph 702 of AZ1 may be connected by an edge 710 to the source vertex 712 in the graph 704 of AZ2, as shown in FIG. 7. These edges 710 allow for paths from AZ1 to AZ2. Next, every sink vertex 712 in the graph 704 of AZ2 may be connected by an edge to the source vertex 714 in the graph 702 of AZ1. (These edges from AZ2 to AZ1 are not shown in FIG. 7.) These edges allow for paths from AZ2 to AZ1. This simplified example in FIG. 7 includes only two AZs. However, where there is a greater number of AZs in a region, every sink vertex of every AZ may be connected to the source vertices in every other AZ, so long as such ordering of AZs is not constrained.

These connections from sink vertices to source vertices may create cyclical loops in the aggregated graph 700. To avoid cyclical paths, the optimization model may keep track of previously visited vertices (or just the source vertices) to avoid traversing the same vertices multiples times. Alternatively, a specific ordering of the availability zones may be enforced using a greedy approach, which will be explained in more detail below.

In some implementations, graphs may be generated at each granularity level. That is, the graph 702 and the graph 704 may model AZs, and thus contain vertices that represent completed clusters. Similarly, additional graphs may be generated that model regions (where the vertices may represent completed AZs) and that model SDP phases (where the vertices may represent completed regions).

For example, the graph 702 that models AZ1 and the graph 704 that models AZ2 may be aggregated to form the aggregated graph 700, as shown in FIG. 7. The aggregated graph 700 may be simplified to generate a simplified graph 706 at the region layer, as shown at the bottom of FIG. 7. In the simplified graph 706, a vertex may represent one or more completed AZs up to that state; and an edge may represent a deployment action of a set of AZs to transition from one state to another state, an estimated deployment time value, and an estimated deployment risk value. This process would create another layer of graphs that model the region layer. The deployment time and risk values in the edges of the graphs at the region layer may be aggregates of the deployment time and risk values in the graphs at the AZ layer.

Furthermore, this aggregating and simplifying process may be repeated to generate yet another layer of graphs that model the SDP phase layer. For example, at the SDP phase layer, each state vertex may include a set of completed regions, and the edges may include estimated aggregate deployment time values and estimated aggregate deployment risk values. Similar to the graphs in the AZ layer, graphs in the region layer and in the SDP phase layer can also include source vertices, include sink vertices with varying completion percentage values and/or bake time values, and model batch size limitations, etc.

Figure 8:
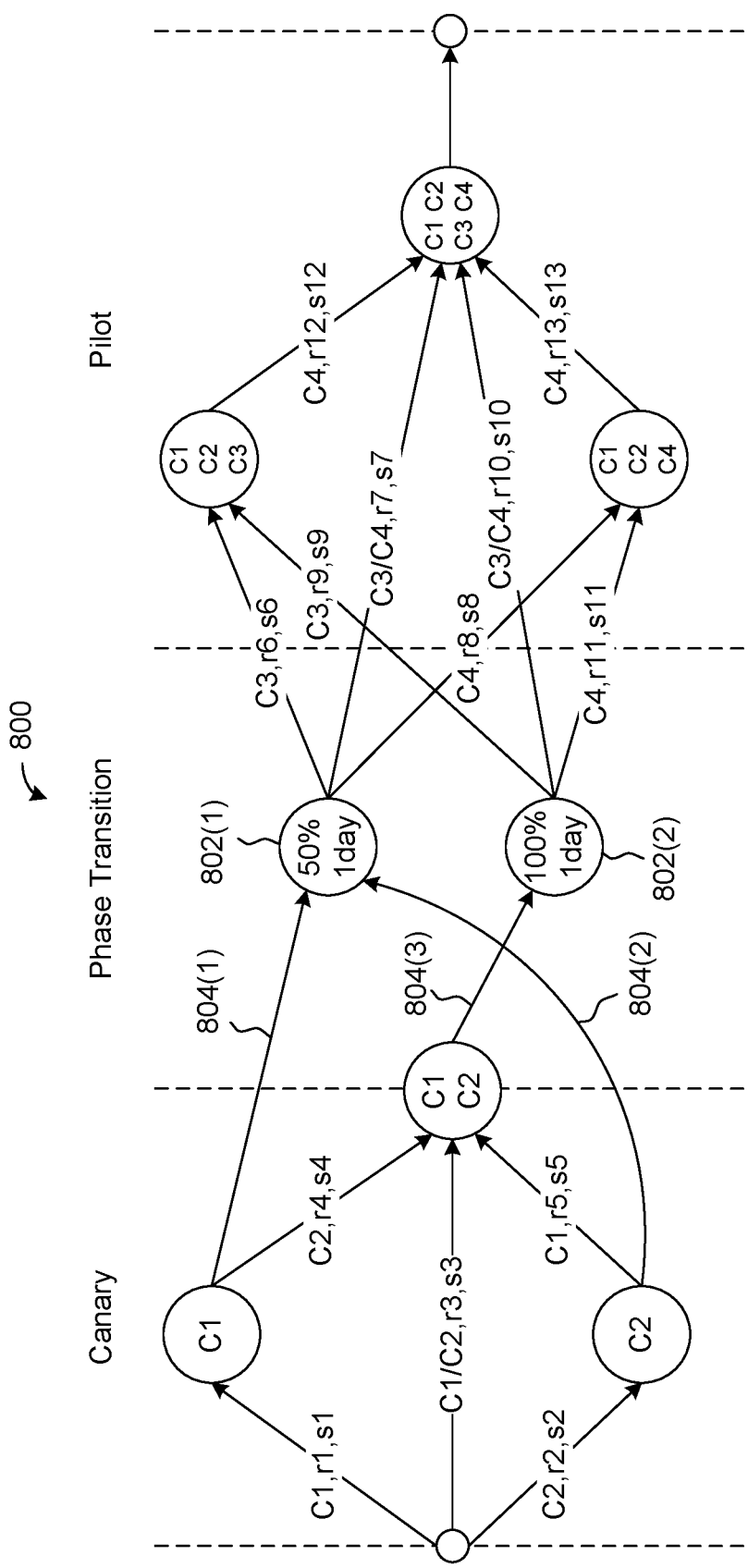
FIG. 8 shows a transition graph, consistent with some implementations of the present concepts.

FIG. 8 shows a transition graph 800, consistent with the present concepts. The transition graph 800 illustrates a simplified example of a transition from the canary phase to the pilot phase, where the canary phase includes two clusters C1 and C2, and the pilot phase includes two clusters C3 and C4. In this example, the maximum batch size may be two for both phases, such that up to two clusters can be simultaneously deployed to at a time. Furthermore, the minimum completion percentage may be 50% for the canary phase so that deployment can advance to the pilot phase when deployment to the canary phase is 50% or more complete.

The transition graph 800 may include one or more transition vertices 802 (illustrated in the center of FIG. 8) to model the transition between the two phases. A transition vertex 802 may be a sink vertex for the previous SDP phase and a source vertex for the next SDP phase. Each transition vertex 802 may include a completion percentage value and/or a bake time value. In some implementations, an edge 804 leading to a transition vertex 804 may include an associated deployment time value and an associated deployment risk value to account for time and risk during the phase transition.

Accordingly, multi-layer graphs may be generated for the multiple hierarchical levels of cluster groupings (e.g., AZs, regions, and SDP phases). The nested parent-child relationship among SDP phases, regions, AZs, and clusters in the deployment structure may form a multi-layer graph problem in the aggregated graphs.

Optimization

Consistent with some implementations of the present concepts, the optimization model may use one or more optimization algorithms to find the shortest (or optimal) path in the graph that results in minimum estimated deployment time and/or minimum estimated deployment risk. Any suitable optimization algorithms can be used to solve the shortest path graph problem or estimate an optimal or efficient solution to the shortest path graph problem. During experimental testing of the present concepts, multiple optimization algorithms were evaluated and/or tested to determine their performance (e.g., in terms of computation times and solution optimality). Their pros and cons will be discussed below.

In some implementations, the shortest path graph problem may be solved layer by layer, starting from the most granular layer and then working up to the least granular layer. In some implementations, the choice of optimization algorithm may be the same or different for each AZ, each region, and each SDP phase.

The brute force method of solving the shortest path graph problem may involve checking every single possible path in the entire graph, one by one. However, the computational complexity of solving the shortest path graph problem may be NP complete. For instance, the size of the graph and thus the number of possible paths in the graph may grow exponentially with the number of clusters within an AZ and with the number of regions within an SDP phase, and/or grow factorially with the number of AZs within a region and with the number of regions within an SDP phase. The complexity of the graph may also grow with the number of parameters being optimized, such as the batch size, completion percentage, bake time, etc. To further complicate the graph problem, the optimization model may optimize for multiple objectives. Here, in this example, the multiple objectives (i.e., speed and risk) contradict each other. That is, the faster the deployment, the riskier the deployment.

Accordingly, for real-life scenarios where the number of target clusters can be very large (e.g., multiple thousands), the size of the graph may explode into an incredible size, containing a very large number of state vertices and an even larger number of possible paths. Exhaustively checking every possible solution using the brute force method may be impractical due the long computational time that it takes before commencing deployment. Moreover, even if the brute force method could be used, by the time the optimal solution is determined, the state of the cloud computing fleet may have changed, possibly rendering the solution less than optimal.

For these reasons, the brute force method may be useful for a very small number of target clusters (i.e., a very small sized deployment), but the brute force method may not be a feasible choice for a larger number of target clusters. Moreover, the brute force method may be useful for setting a baseline performance to compare and evaluate other techniques (i.e., multiple optimization algorithms).

Therefore, different techniques may be more apt for a large number of target clusters. Certain techniques may reduce the computational complexity of the shortest path graph problem. For example, the size of the graph may be reduced by applying bounds on the deployment parameters, and certain optimization algorithms may prune the cluster deployment orders. Moreover, some optimization algorithms may efficiently estimate or approximate the shortest path (rather the finding the actual shortest path) while generating only a limited graph (without generating the entire graph).

In some implementations, the concept of a greedy approach, such as an extreme greedy method, may be used. For example, the multiple objectives (i.e., speed and risk) may be combined or scalarized using a function with weights into one objective. Then, the clusters may be ranked by their associated weighted objective, calculated using the prediction models. Furthermore, because generating the entire graph ahead of time and solving for an optimal solution to the entire graph is very computationally expensive, the optimization model may leverage the multi-layered nature of the graph problem by solving a smaller graph at the most granular layer first and applying the greedy approach. At every step, the top ranked (i.e., the lowest weighted) cluster or combination of clusters may be selected. For instance, the optimization model may first solve the smaller graphs for the clusters within the same AZ individually, and then the optimization model may search through the optimal solutions from only these graphs when solving for the aggregated levels at the less granular layers.

Therefore, the greedy approach may quickly prune or eliminate non-optimal solutions (or paths that are less likely to be optimal) as early as possible at each of the layers. This greedy approach may significantly reduce the computational complexity of the shortest path graph problem, since less than all possible permutations of deployment orders and parameters need to be graphed and evaluated.

The greedy approach may be typically very fast and may waste less computational resources on checking solutions that are unlikely to be optimal. However, because the greedy approach selects only the local best option at the current step, the greedy approach may miss the impact on the overall solution, miss the big picture, and eliminate solutions that may not appear optimal in the current step but may end up being part of the global optimal as a whole. That is, the greedy approach may be too shortsighted by selecting only the local optimal at each step while evaluating only a piece of the entire problem. Thus, the greedy approach may lose the guarantee of finding the actual global optimal solution. Nonetheless, the solutions found by the greedy approach can closely approximate the actual optimal solutions in most scenarios and thus may be acceptable for most real-life situations. As explained above, the greedy approach may only work with scalarization, where multiple objectives have to be combined into one objective.

Greedy-Brute Force Algorithm

Alternatively, consistent with some implementations of the present concepts, a greedy-brute force method may be used to solve the shortest path graph problem. A greedy-brute force method may combine the concept of the greedy approach and the brute force method. In some implementations, the greedy-brute force method, applied to the present concepts, may solve for solutions at the most granular layer first and then work its way up to the least granular layer. At a high level, the optimization model using the greedy-brute force method may rank clusters by dominance (this is the greedy approach), then iterate through all possible permutations within the cluster ranking determined by dominance (this is the brute force method), and then keep the non-dominated solutions. The concept of dominance will be explained below.

The optimization model, consistent with the present concepts, may consider multiple objectives, for example, speed and risk. Some administrators may want to deploy a small-change payload quickly to meet a deadline and are thus willing to take on the increased risk of fast deployment. Other administrators, on the other hand, may want to deploy a new but non-critical feature and thus not be in a hurry but rather prefer to minimize risk and make sure the deployment succeeds without problems. Different administrators for different payloads may have different preferences and tolerances for the multiple objectives. Thus, to address these preferences, the optimization model may output multiple optimal solutions, from which an administrator may choose, rather than outputting just one optimal solution.

Figure 9:
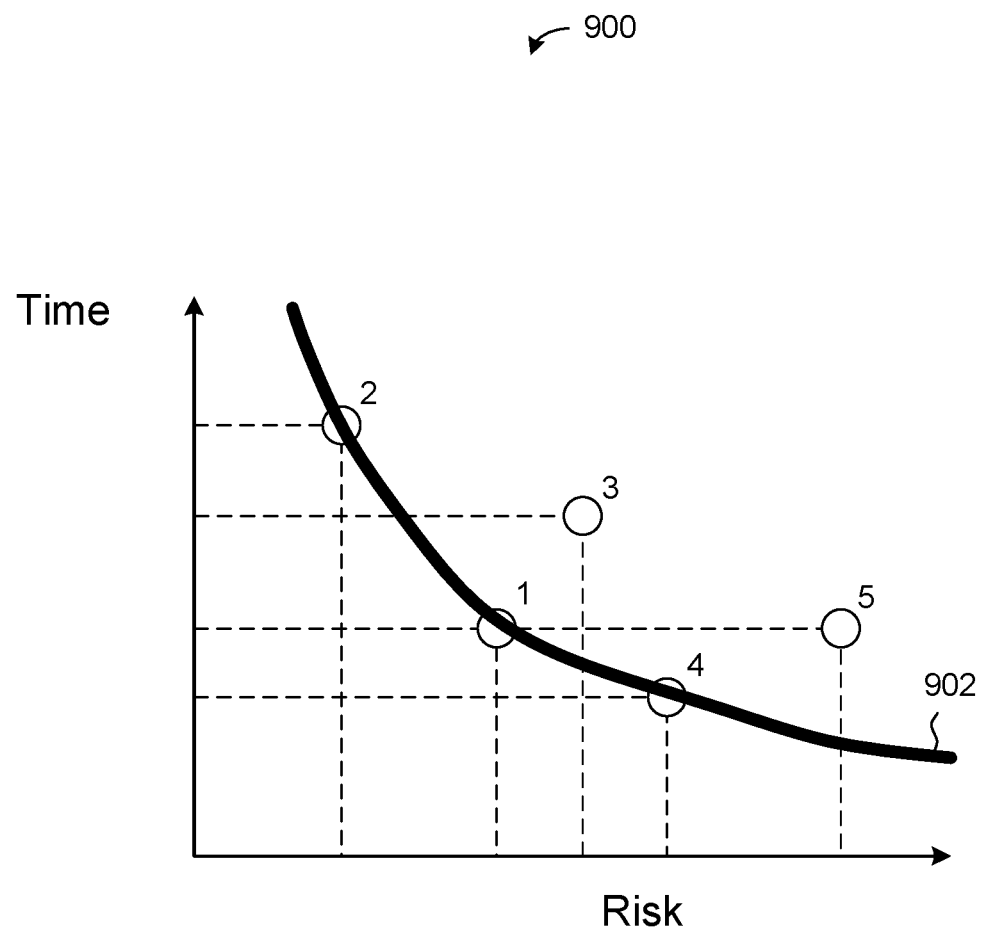
FIG. 9 shows a graph plot of multiple solutions, consistent with some implementations of the present concepts.

FIG. 9 shows a graph plot 900 of multiple solutions, consistent with the present concepts. The graph plot 900 is a simplified example that includes only five potential solutions. The axes in graph plot 900 may represent the multiple objectives. In this example, the y-axis represents deployment time and the x-axis represents deployment risk, which are being minimized. Five solutions numbered 1 through 5 have been plotted in the graph plot 900 according to their associated time and risk values.

Ideally, the best or optimal solutions would be plotted towards the bottom-left corner near the origin of the graph plot 900, as such solutions would have minimum time and minimum risk. However, many multi-objective optimization problems may not have one optimal solution that is better than all other solutions. Rather some solutions may be better than (or dominate) other solutions in terms of both time and risk. Whereas some solutions may be better than other solutions only with respect to one objective (e.g., time) but worse with respect to the other objective (e.g., risk).

Therefore, in general, Solution_A dominates Solution_B if Solution A is no worse than Solution_B with respect to all objectives. Furthermore, a solution that is not dominated by any other solution is a non-dominated solution or a Pareto-optimal solution. A boundary or a curve defined by the set of non-dominated solutions is called a Pareto-optimal front.

For example, in the graph plot 900, Solution_1 dominates Solution_3, because Solution_1 has better time and better risk than Solution_3. Similarly, Solution_4 dominates Solution_5, because Solution_4 has better time and better risk than Solution_5. However, Solution_2 does not dominate Solution_1 or Solution_4, because even though Solution_2 has lower risk, it has higher time compared to Solution_1 or Solution_4. In this example, Solution_1, Solution_2, and Solution_4 are considered non-dominated solutions, because no other solution dominates any of them. As can be seen in FIG. 9, these non-dominated solutions (Solution_1, Solution_2, and Solution_4) trace a Pareto-optimal front 902.

The computational complexity of finding the true Pareto-optimal front (i.e., the complete set of all non-dominated solutions) of a multi-objective shortest path graph problem may be NP complete. However, the optimization model, consistent with the present concepts, may use one or more optimization algorithms that can estimate the Pareto front much faster.

The computational complexity of using the brute force method, which searches through the entire solution space as discussed above, to solve a graph that models multiple clusters within one AZ may be $O(2^{N-1} \times N!)$, where N is the number of clusters in the graph. By using the greedy-brute force method to quickly prune the search space, the computational complexity may be reduced to $O(2^{N-1})$.

In some implementations, the greedy-brute force method may involve the following steps:
1) Compute the dominance rank of each cluster. The dominance rank of a cluster may be the number of other clusters that dominate that cluster. Thus, the dominance rank of each cluster can be quickly determined by the prediction models based on the associated time and risk. For instance, a non-dominated cluster may have a dominance rank of zero, whereas another cluster with a high deployment time estimate and a high deployment risk estimate may have a high dominance rank value.
2) Generate a graph in which the only edges allowed between two state vertices are those that satisfy two conditions: (1) a directed edge from a state vertex i to a state vertex j is allowed if the clusters in state i are a subset of the clusters in state j, and (2) the dominance rank of the clusters in state i is no higher than the dominance rank of the clusters in state j. Thus, the deployment ordering of the clusters may proceed from low-ranking clusters (i.e., low time and low risk) to high-ranking clusters (i.e., high time and high risk). Thus, the graph would not include other paths (i.e., other edges) that violate these two conditions. This greedy approach may fix the ordering of the clusters, which would prune away other paths that may have included disallowed edges, thus reducing the computational complexity.
3) Exhaustively search through the solution space using the brute force method on the limited allowed paths in the graph.

Accordingly, the greedy-brute force method may first determine the deployment order of clusters based on a greedy ranking and then search through all options for different deployment batch sizes based on the fixed cluster order. For example, for an AZ containing only three target clusters, the greedy-brute force method may rank the three clusters by dominance in the order C1, C2, C3. This may be the greedy portion of the technique, ranking from the fastest speed and least risky cluster first to the slowest speed and most risky cluster last. Then, a brute force method may be applied to check all possible combinations of paths without changing the rank-based order of clusters:

C1-C2-C3
C1/C2-C3
C1-C2/C3
C1/C2/C3

And then, the non-dominant solutions may be kept as the best solutions. Accordingly, there may be no need to generate the entire graph but only a subset of the entire graph that conforms to the dominance ranking. The other portions of the graph and other possible solutions that do not conform to the dominance ranking may not be evaluated.

The greedy-brute force method may work with a non-dominated approach and may be fast for small graphs. However, as mentioned above, the computational complexity may still grow exponentially with the number of clusters. Therefore, the greedy-brute force method may be better suited for smaller graphs than larger graphs.

Evolutionary Algorithm

Alternatively, consistent with some implementations of the present concepts, an evolutionary algorithm may be used to solve the shortest path graph problem. An evolutionary algorithm, such as the non-dominated sorting genetic algorithm version 2 ("NSGA-II"), may be a genetic algorithm that mimics natural evolution of species. Generally, an evolutionary algorithm may randomly pick an initial parent population, evolve the parent population to create a new generation of offspring population, select the best individuals from the combination of the parent population and the offspring population to survive and killing off the rest, and repeat the process multiple iterations by treating the surviving population as the new parent population for further evolution. This evolution process may be repeated until there is a convergence in the population.

Applying the evolutionary algorithm to the shortest path graph problem, a set of randomly selected paths may be generated as the initial parent population, these paths may be evolved to generate an offspring population of different paths, the best paths (based on their associated speed and risk) may be selected for survival, and these steps may be repeated using the surviving paths as the new parent population until the new generations of paths converge to approximate a Pareto-optimal front.

In some implementations, the evolutionary algorithm may involve the following steps:

1) Initialize a parent population of randomly generated solutions of paths $(s_0^0, s_1^1, s_2^0 \ldots, s_n^0) \in S^0$.
2) Evolve the parent population paths (e.g., through mutation and/or crossover/recombination, which will be explained below) to breed an offspring population of new paths.
3) Compute a dominance rank value and a distance value for each path in the parent population and in the offspring population. A dominance rank value may be the number of other solutions that dominate the path. A dominance rank value of zero may represents a non-dominated solution. A distance value may reflect the spacing between the path and other solutions, which may be inversely related to density or proximity. In one implementation, the distance value may be calculated as follows:

$$\text{distance}_i = \sum_1^m \left( \frac{O_{i-1}^k - O_{i+1}^k}{\max(O^k) - \min(O^k)} \right)^2$$

where $O_i^k$ is the kth objective value for the ith individual in the population. The distance value may represent whether a solution is in a sparce or a crowded area in the objective space and may be measured by the square sum of the normalized distance between the neighbors.

4) Sort all the paths in the parent population and the offspring population together in ascending order of the dominance rank value first, and then, where dominance rank values are tied, sort in descending order of the distance value.
5) Select the top n paths from the sorted paths for survival. The remainder bottom paths may be killed off or discarded.
6) Evolve the selected n paths by repeating Steps 2 through 5 for g generations until there is a convergence.

In some implementations, the initial population of parent paths may be a randomly generated chain of clusters connected together to represent a deployment sequence of clusters. For example, depending on the number of target clusters, 100 randomly generated paths may be used as the initial set of solutions. In a very simplified example, the initial population may include the sequences: C1-C2, C2-C1, and C1/C2.

Several factors may be considered when determining the initial population size. A larger population may have a higher chance of finding good solutions. However, a larger population may require more computation resources and computation time. Generally, the population size may depend on the number of target paths.

The initial population of paths may affect how well the final solutions approximate the true Pareto-optimal solutions and how quickly (in terms of the number of generations) the algorithm converges. Accordingly, to increase the efficiency and/or accuracy of the algorithm, in some implementations, the greedy approach may be applied to the initialization step of generating the initial parent population of paths. Similar to the greedy approach described above, the target clusters may be ranked according to the number of other dominant clusters, and then the different batch size options may be sampled based on the dominance-ranked cluster order. However, unlike the exhaustive brute force evaluation of all possible combinations, as discussed above, here, only a limited number of initial feasible solutions may be generated to obtain the initial parent population. This method may effectively reduce the search space to eliminate paths that are unlikely to be optimal. Furthermore, an initial parent population generated using the greedy approach may be a better starting point for the evolutionary algorithm than an initial parent population generated randomly.

Consistent with some implementations of the present concepts, because the initial parent population of paths may include fewer than all possible permutations of target clusters, there is no need to generate the entire graph ahead of time. Instead, a limited graph may be initially generated to model the initial parent paths. And then, moving forward, the graph may be updated on an ongoing basis as additional paths are bred through evolution and/or discarded through the selection process.

Consistent with the present concepts, the evolutionary algorithm may start with the initial set of paths and then explore new paths that are bred through mutation and/or crossover techniques in an efficient manner at each new generation. The end goal may be to arrive at a generation of paths that is a very close approximation of the true Pareto-optimal front.

In some implementations, mutation evolution may be used to randomly change a small portion of the existing path to explore a new path. For example, if a parent path is C1-C2-C3-C4, then this solution may be mutated by randomly changing the order of two or more clusters to generate a new offspring path, such as C1-C4-C3-C2. In this example, the order of clusters C2 and C4 were swapped (i.e., mutation). Additionally, the new offspring path may be checked to confirm that it is a feasible solution in view of any constraints or limits on deployment parameters.

Figure 10:
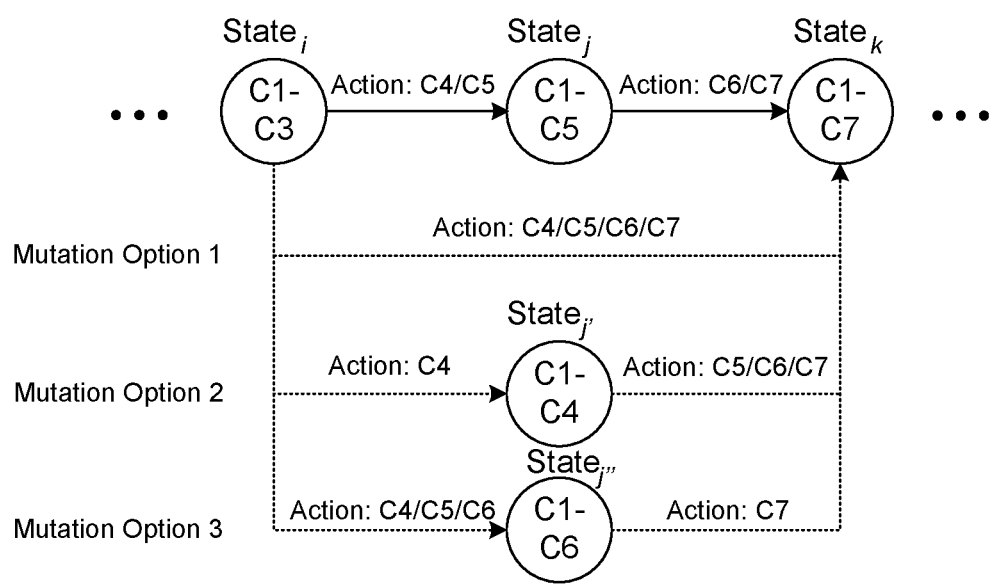
FIG. 10 shows a mutation evolution, consistent with some implementations of the present concepts.

FIG. 10 shows an example mutation evolution, consistent with the present concepts. The top of FIG. 10 shows three state vertices in the middle of a longer sequence of vertices of an example parent solution. The three state vertices may represent State_i containing clusters C1, C2, and C3; State_j containing additional clusters C4 and C5; and State_k containing additional clusters C6 and C7. In one example mutation, the optimization model may select a random state vertex in the parent solution. Here in this example, State_j may be randomly selected. Then, the optimization model may randomly sample one or more feasible paths from State_i to State_k. In other mutations, the optimization model may sample paths from one, two, three, or any other number of vertices before and/or after the randomly selected vertex State_j.

FIG. 10 shows three example mutation options. In Mutation Option 1, four clusters C4/C5/C6/C7 are concurrently deployed to, such that the deployment path advances from State_i directly to State_k. Mutation Option 1 may be feasible if the maximum batch size is at least four. Mutation Option 1 may have lower deployment time but higher deployment risk by deploying to all four clusters at once. In Mutation Option 2, from State_i, only cluster C4 is deployed to, and then from State_j', three clusters C5/C6/C7 are concurrently deployed to, thereby arriving at State_k. In Mutation Option 3, from State_i, three clusters C4/C5/C6 are concurrently deployed to, and then from State_j″, only cluster C7 is deployed to, thereby arriving at State_k. Mutation Option 2 and Mutation Option 3 may be feasible if the maximum batch size is at least three.

FIG. 10 illustrates only three example mutation options for explanatory purposes, but the optimization model may sample many more possible mutations in the search space (i.e., other feasible paths from State_i to State_k). Next, the optimization model may randomly pick one of the three (or more) mutation options to generate a new offspring solution. The new offspring solution may keep the same state vertices before State_i and after State_k as the parent solution. In one implementation, each parent may be mutated to create one offspring. In another implementation, one parent solution may be mutated multiple times to generate multiple offspring solutions, and/or a subset of the parent population may be randomly selected for mutation evolution.

In some implementations, crossover or recombination evolution may be used to breed two parent solutions to generate two new offspring solutions. This cross-breeding may also allow the optimization model to explore new paths. For example, suppose there are two parent solutions with the following deployment paths:

C1/C2/C3-C4/C5-C6/C7
C1/C2/C3/C4-C5-C6/C7/C8/C9

In some implementations, two parent solutions may be cross-bred if they share at least one state vertex that is not the first or the last state vertex. In this example, the two parent solutions share a common state vertex that contains clusters C1 through C5. As one example crossover evolution, these two parent solutions may be cross-bred by swapping the vertices before and after the shared vertex to generate two new offspring solutions with the following deployment paths:

C1/C2/C3-C4/C5-C6/C7/C8/C9
C1/C2/C3/C4-C5-C6/C7

The two offspring solutions may include different parts of their parent solutions. Specifically, in the example above, the first offspring solution may include the earlier segment of the first parent solution before the common state vertex and the later segment of the second parent solution after the common state vertex; and the second offspring solution may include the earlier segment of the second parent solution before the common state vertex and the later segment of the first parent solution after the common state vertex. These four solutions (two parents and two offsprings) may differ in deployment order, batch size, and/or completion percentage (i.e., advancing after deploying to seven clusters versus after nine clusters).

In some implementations, where solution paths involve advancing when less than 100% of clusters have been deployed to, the final solutions may include all target clusters by tacking on another state vertex that includes all remaining clusters. Such an additional vertex may not impact the overall deployment time and/or the overall deployment risk, because the deployment process may have already advanced to the next stage and the remaining clusters may be deployed to in the background.

The above explanation is just one example of crossover evolution. Other kinds of crossover breeding may be possible, for example, swapping multiple segments of vertices where the two parent solutions share multiple common vertices. A feasibility check may be performed on newly generated offspring solutions.

Figure 11:
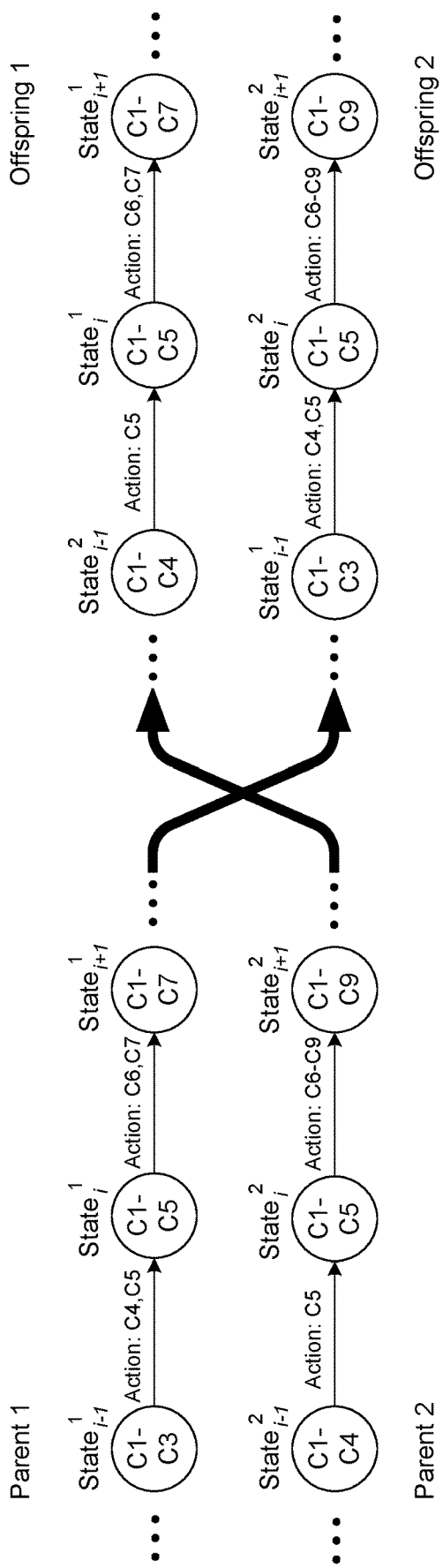
FIG. 11 shows a crossover evolution, consistent with some implementations of the present concepts.

FIG. 11 shows another example of a crossover evolution, consistent with the present concepts. In this example, Parent 1 is shown on the top-left corner of FIG. 11, and Parent 2 is shown on the bottom-left corner of FIG. 11. FIG. 11 shows only a short segment of three vertices but the full paths for these two solutions may be much longer. The two parent solutions may have State_i as the common state. In this example crossover evolution, two new offspring solutions may be generated by crossing over the two parent solutions' paths at the common State_i vertex. Accordingly, Offspring 1, shown in the top-right corner of FIG. 11, may include the path segment of Parent 2 before common State_i vertex and the path segment of Parent 1 after common State_i vertex; and Offspring 2, shown in the bottom-right corner of FIG. 11, may include the path segment of Parent 1 before common State_i vertex and the path segment of Parent 2 after common State_i vertex. Thus, this crossover evolution may leverage the genetic concept of DNA sequence swapping. In one implementation, random pairs of a parent population that share at least one common state vertex may be selected for crossover evolution to generate an offspring population.

Consistent with the present concepts, offspring solutions may be generated using mutation or crossover, or a combination of both. During experimental testing of the present concepts, tests of the evolutionary algorithm were run using only mutation evolution and only crossover evolution. In these tests, mutation evolution found a larger number of estimated Pareto-optimal solutions compared to the crossover evolution. However, crossover evolution was able to find certain better solutions that mutation evolution could not find. In the tests, performing both mutation evolution and crossover evolution generally produced better results than using only one type of evolution. However, mutation evolution ran faster than crossover evolution, so mixing mutation and crossover took additional processing time compared to mutation only. Thus, the marginal improvement in solution optimality by mixing crossover evolution to mutation evolution may be weighed against the sacrifice of computational time and resources associated with crossover evolution. The choice of using only mutation evolution, only crossover evolution, or a mix of mutation and crossover and in what proportions may be tweaked and fine-tuned through experiments and trials.

After generating a new population of offspring solutions (whether via mutation and/or crossover), the optimization model may select the elite ones among the combination of both the parent solutions and the offspring solutions for survival. The elite solutions may have lower deployment time and lower deployment risk compared to the remainder of solutions that will be discarded. The surviving elite solutions may be considered a new generation of solutions (i.e., the new parent solution) that may be evolved again, and this process may be iterated multiple times for multiple generations.

In some implementations, to select the elite solutions, the evolutionary algorithm may use two metrics to sort the parent population and the offspring population jointly. The first metric may be a dominance rank equal to the number of dominant solutions. As explained above, one solution may be dominated by another solution that is better for all objectives (i.e., has a better deployment time value and a better deployment risk value). Therefore, at the very top of the sorting order may be a set of non-dominated solutions that have a dominance rank value of zero. Next in the sorting order may be a set of solutions that are dominated by one solution and thus have a dominance rank value of one. Next in the sorting order may be a set of solutions that are dominated by two solutions and thus have a dominance rank value of two. This ranking process may be repeated to sort the entire populations of parent and offspring solutions by ascending dominance rank values.

The second metric may be a distance value that measures the distance of a solution from other neighboring solutions in the objectives space. This metric may measure the density of other solutions around each solution. The evolutionary algorithm may use the example distance formula given above or any other formula that measures the density or scarcity of other solutions in the neighboring objectives space area.

Next, the evolutionary algorithm may select the elite individuals in the populations of parents and offsprings based on the two metrics. In one implementation, the entire populations of the parent solutions and the offspring solutions may be primarily sorted together by their dominance rank values. A lower dominance rank value is preferred for surviving the selection process. Then, a certain number of top sorted solutions may be selected for survival. In one implementation, the number of surviving solutions and thus the size of each generation may be kept the same as the size of the initial population (e.g., 100). In alternative implementations, the sizes of different generations may vary. To break a tie among a group of solutions that have the same dominance rank value, such solutions may be secondarily sorted by their distance values. Solutions in sparse areas (i.e., having high distance values) are more preferred for survival than solutions in dense areas (i.e., having low distance values), because diverse populations are more effective in exploring new solutions. The remainder of the solutions that do not make the cut may be discarded as less optimal solutions. Thus, the solutions space (i.e., the number of solutions at each generation) may be limited, the computational complexity of the evolutionary algorithm may be significantly lower and the problem of exponentially growing graph complexity may be mitigated.

The surviving solutions may be considered the strongest in this generation that have been selected for the next iteration of evolution (mutation and/or crossover) to generate new offspring solutions and thereby explore additional new paths. The above-described process may be repeated multiple times to repeatedly create new offspring solutions through evolution, survive the top solutions, and eliminate the bottom solutions. With each iteration, the new generation of solutions may be progressively better (i.e., improved optimality) with respect to the time and risk objectives. In some implementations, the new generations of solutions may converge, meaning subsequent generations are not substantially better than previous generations with respect to the objectives.

Figure 12A:
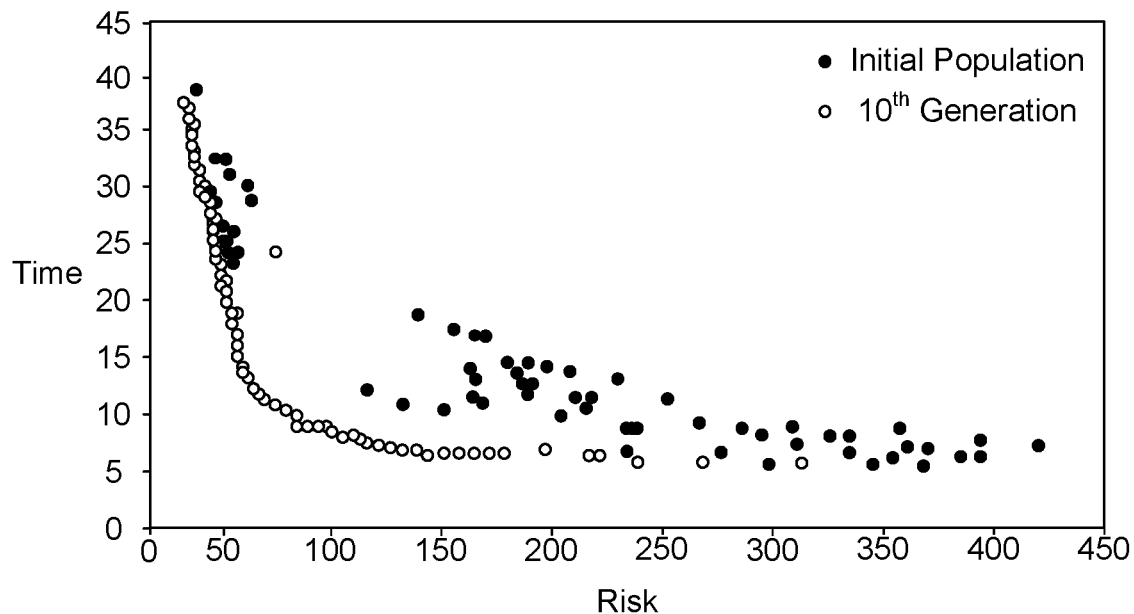
FIGS. 12A and 12B show graph plots of generations of solutions, consistent with some implementations of the present concepts.
Figure 12B:
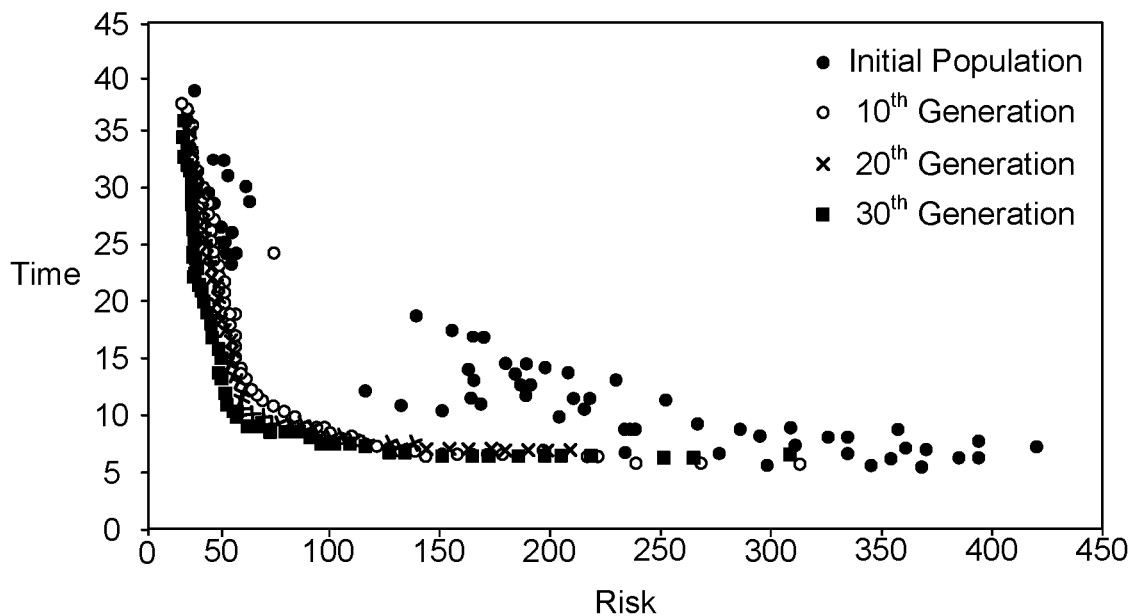

FIGS. 12A and 12B show graph plots of generations of solutions, consistent with the present concepts. These graph plots show the objective space, where the y-axis is time and the x-axis is risk. In one implementation, the time values in the y-axis may be in minutes, and the risk values in the x-axis may be in a unitless metric. The plots of solutions in these graph plots were obtained from experimental testing of the evolutionary algorithm, consistent with the present concepts.

In FIG. 12A, the initial population of solutions is shown using black circles. The 10th generation of solutions is shown using white circles. Generally, the 10th generation of solutions is better with respect to the two objectives than the initial generation of solutions. In FIG. 12B, the 20th generation of solutions is shown using x's, and the 30th generation of solutions is shown using black squares.

As can be seen in these graph plots, generations of solutions—created and survived through multiple iterations of evolution and selection, progressively improve with regard to deployment time and risk. Although not shown in these figures, during the experimental tests, the 40th and 50th generations of solutions were not significantly better than the 30th generation of solutions. Thus, the solutions converged, and the evolutionary process was stopped. At this point, the 50th generation of solutions may be considered the best approximations of the true Pareto-optimal solutions.

In one implementation, a fixed number of evolution iterations (e.g., the 50th generation) may be set as the termination of the evolutionary algorithm. In an alternative implementation, the optimization model may be more efficient and/or more effective if the evolutionary algorithm terminated at a variable number of iterations. For example, the time and risk values associated with the current generation of solutions may be compared with previous generations (e.g., the past 5 or 10 generations) of solutions. If there is no significant improvement, then the evolutionary algorithm may be terminated. Conversely, if there is a substantial improvement, then the evolutionary algorithm may be continued. Accordingly, the evolutionary algorithm may stop early if convergence is achieved quickly without wasting time and resources on further generations that would not improve solution optimality. On the other hand, if convergence is not yet achieved, then the evolutionary algorithm may be allowed to continue to further improve solution optimality.

As shown through FIGS. 12A and 12B, the evolutionary algorithm may search for the optimal solutions through the evolutionary process. However, the evolutionary algorithm may not guarantee the true Pareto-optimal solutions. Nonetheless, the evolutionary algorithm has proven to be very effective in approximating the Pareto-optimal solutions.

Moreover, the evolutionary algorithm may be efficient and run very quickly at finding the estimated Pareto-optimal front. Because the problem space may be reduced to the small set of solutions in a population, the complexity of the graph may be reduced to a manageable size. Thus, the evolutionary algorithm may not require constructing the entire graph upfront. Instead, the evolutionary algorithm may initialize a limited graph based on the initial population of solutions, and then modify the graph as new solutions are explored and selected through the evolutionary process.

In some implementations, the optimization model may use different optimization algorithms for different AZs, regions, and/or SDP phases, depending on which optimization algorithm is better suited to handle the specific graph problems. In the experimental testing performed using the present concepts, the performance of multiple optimization algorithms was measured and compared for different sets of graph problems.

TABLE 1

| Number of Clusters | Brute Force Time (s) | Greedy-Brute Force Time (s) | Evolutionary Algorithm Time (s) |
| --- | --- | --- | --- |
| 8 | 120 | 0.2 | 1.6 |
| 12 | — | 0.5 | 1.8 |
| 15 | — | 6.5 | 2.33 |
| 16 | — | 16 | 2.28 |
| 18 | — | 66 | 2.6 |

Table 1 above shows the computational time taken by the greedy-brute force method and by the evolutionary algorithm compared to the baseline brute force method for solving graph problems having varying number of clusters.

The brute force method may generate the entire graph and exhaustively search all possible solutions to find the global optimum. Therefore, the brute force method may be computationally very expensive even for a small number of clusters. As such, the brute force method was conducted only for the cluster size of 8. Relatively, the greedy-brute force method and the evolutionary algorithm took far less time than the brute force method.

The solutions output by the greedy-brute force method were very close to the actual global optimum solutions output by the brute force method. Although the greedy-brute force method reduces the computational complexity compared to the brute force method, the computational time still grew exponentially as the number of clusters grew. This was because the greedy-brute force method still checked all combinations after fixing the ranking of the clusters. Thus, the greedy-brute force method may be more useful for small AZs with fewer clusters than large AZs with many clusters.

The solutions output by the evolutionary algorithm (NSGA-ii specifically in the experimental tests) were very close to the actual global optimum solutions output by the brute force method. Significantly, the computational time taken by the evolutionary algorithm grew more linearly and did not grow as fast as the greedy-brute force method as the number of clusters increased. This was because the evolutionary algorithm fixed the size of the population and the number of iterations. This reduction in computational time may be a tremendous advantage that may be amplified even more for very large AZs that have many clusters. The computational time needed to find solutions may be very important, because if it takes 10 minutes to compute solutions for a large AZ with 200 clusters, then it may take several hours to find solutions for hundreds of AZs. Waiting hours to generate deployment plans may be undesirable for many reasons, especially because the state of the deployment and the state of the cloud computing fleet may have changed significantly in that time. Furthermore, holding up one deployment for several hours can create a backlog and clog the deployment queue.

Comparing the greedy-brute force method and the evolutionary algorithm, the estimated Pareto-optimal solutions output by both the greedy-brute force method and the evolutionary algorithm were close to each other and closely approximated the true Pareto-optimal solutions output by the brute force method. However, the solution optimality was slightly better with the greedy-brute force method over the evolutionary algorithm.

Furthermore, the greedy-brute force method was faster for smaller numbers of clusters, whereas the evolutionary algorithm was faster for larger numbers of clusters. Accordingly, in one implementation, the greedy-brute force method may be used for availability zones with fewer than 15 clusters and the evolutionary algorithm may be used for availability zones with 15 or greater clusters, based on the computational times from the experimental testing shown in Table 1. In an alternative implementation, the greedy-brute force method may be used for availability zones with 16 or fewer clusters and the evolutionary algorithm may be used for availability zones with greater than 16 clusters, as a compromise between computational time and solution optimality.

To illustrate how the optimization algorithms may be applied to solving a multi-layer graph problem, suppose there is a target fleet containing multiple SDP phases, each SDP phase containing multiple regions, each region containing multiple AZs, and each AZ containing multiple clusters. This hierarchical grouping structure of target clusters may be similar to the structure illustrated in FIG. 2.

Starting at the AZ layer, the optimization model may generate graphs where the vertices represent clusters and find optimal solutions for cluster ordering within each AZ. Thus, each of the AZs in the target broad SDP phase may be modeled by an AZ-level graph. For each AZ individually, either the greedy-brute force method or the evolutionary algorithm may be selected (e.g., depending on the number of clusters in the AZ) to find the non-dominated solutions of cluster orderings for the AZ.

Next, at the region layer, the optimization model may generate graphs where the vertices represent AZs and find optimal solutions for AZ ordering within each region. Thus, each of the regions in the target broad SDP phase may be modeled by a region-level graph. The predicted deployment time and risk associated with each AZ may be calculated by aggregating the predicted deployment time and risk associated with the clusters within that AZ. These aggregated deployment time and risk values associated with AZs may be used in the edges of the region-level graphs. For each region individually, either the greedy-brute force method or the evolutionary algorithm may be selected (e.g., depending on the number of AZs in the region) to find the non-dominated AZ orderings for the region. Thus, at this region layer, mutation and/or crossover evolution may explore new offspring sequences of AZs within the region.

Next, at the SDP phase layer, the optimization model may generate graphs where the vertices represent regions and find optimal solutions for region ordering within each SDP phase. Thus, each of the SDP phases in the target fleet may be modeled by an SDP phase-level graph. The predicted deployment time and risk associated with each region may be calculated by aggregating the predicted deployment time and risk associated with the AZs within that region. These aggregated deployment time and risk values associated with regions may be used in the edges of the SDP phase-level graphs. For each SDP phase individually, either the greedy-brute force method or the evolutionary algorithm may be selected (e.g., depending on the number of regions in the SDP phase) to find the non-dominated region orderings for the SDP phase. Thus, at this SDP phase layer, mutation and/or crossover evolution will explore new offspring sequences of regions within the SDP phase.

Deployment Plan Output

The above-described methods may be applied from the most granular layer to the least granular layer to solve for the Pareto solutions for the entire rollout. In some implementations, deployment plans that correspond to the graph problem solutions may be generated and then outputted as deployment plan recommendations. The deployment plans may include the optimal deployment order, other optimal deployment parameters, the overall deployment time, and/or the overall deployment risk. A deployment administrator may choose a preferred deployment plan from the selection of deployment plan recommendations based on the desired level of speed and risk. In some implementations, the selected deployment plan may be sent to a deployment orchestrator to carry out the deployment plan. Deployment plans may be formatted according to a schema that can be consumed by a deployment orchestrator.

Experimental tests were performed to compare the performance of deployments using the present concepts (i.e., deployment plans generated using the smart deployment method described above) versus conventional deployments. In 94% of the cases, the smart deployment methods reduced the deployment times and/or the deployment risks (measured in AIR). Furthermore, the present concepts were able to reduce the deployment times by 1/100 or better in many cases.

As mentioned above, the deployment time values and deployment risk values associated with the selection of deployment plans output by the optimization model may be estimates calculated by the prediction models. In some implementations, the actual deployment time and the actual impact on deployment risk (e.g., AIR) may be measured and compared with the estimates. Any discrepancies between the estimates and the actuals may be used to improve the prediction models and/or the optimization model.

In some implementations, the deployment orchestrator may provide status reports and/or progress updates during and after the deployment. Such reports and updates may include errors as well as current deployment time and current impact on deployment risk. In some implementations, the administrator may be able to query the orchestrator regarding any details related to current and past deployments. Realtime insight into the current deployment may be beneficial, especially where deployment parameters and constraints could be modified on the fly. For example, if an administrator is uncertain about the quality of an update, she may initially set a low batch size limit so that not too many clusters are updated at the same time. However, if the early phases of deployment (e.g., to the canary and pilot phases) are very successful, then the administrator may increase the batch size limit in the middle of deployment to confidently rollout the proven update to many clusters concurrently for later phases (e.g., the broad phase) of the deployment.

The orchestrator may also be configured with mechanisms to deal with problems, such as certain deployment parameters in the deployment plan that cannot be followed. For example, the orchestrator may be configured to fall back to a default deployment plan using default deployment parameter in response to errors or failures.

Process

Figure 13:
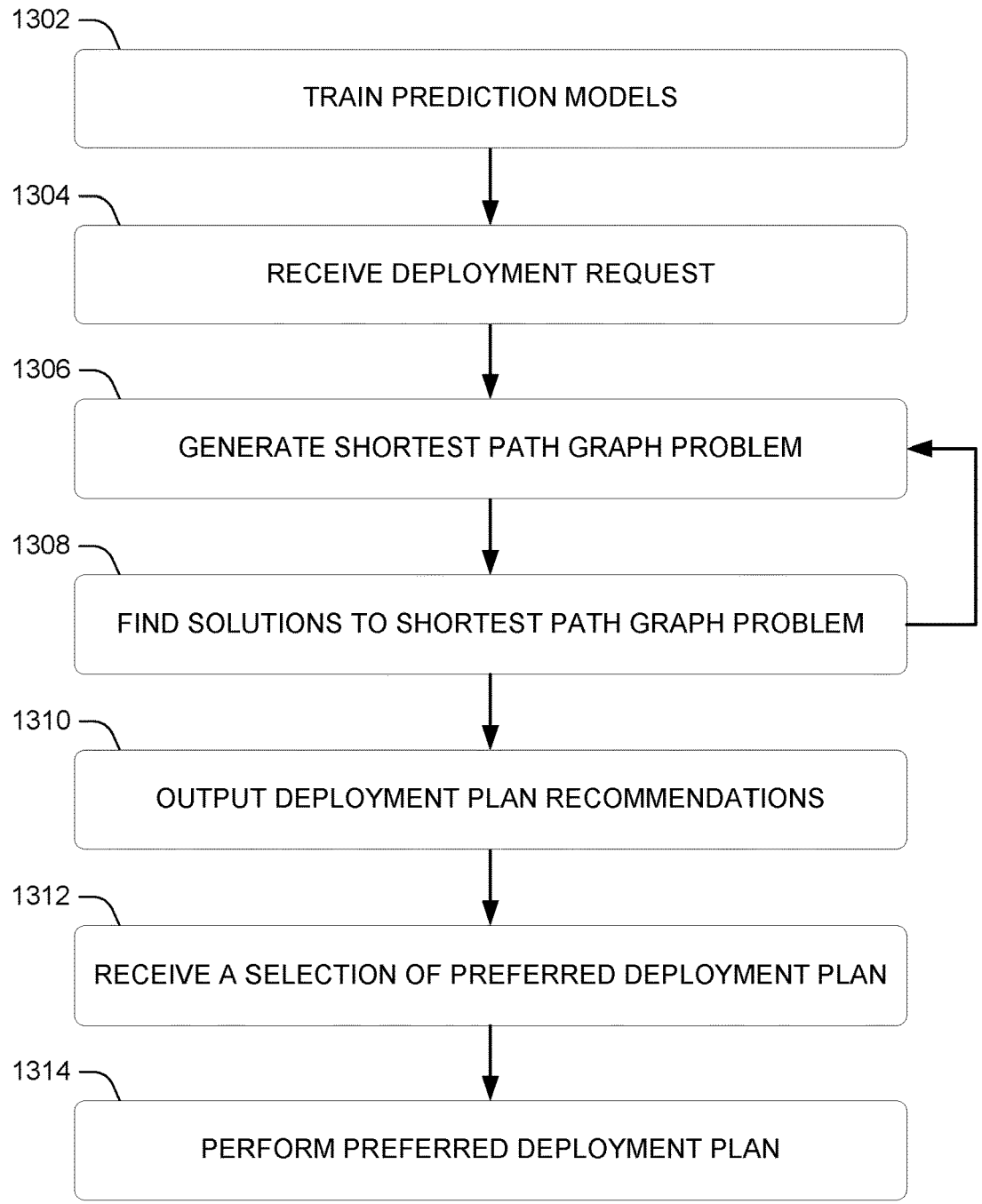
FIG. 13 shows a flow diagram of a smart deployment process, consistent with some implementations of the present concepts.

FIG. 13 shows a flow diagram of a smart deployment method 1300, consistent with the present concepts. The smart deployment method 1300 is presented for illustration purposes and is not meant to be exhaustive or limiting. The acts in the smart deployment method 1300 may be performed in the order presented, in a different order, serially or concurrently, or may be omitted. Any or all of the acts in the smart deployment method 1300 may be performed by software, hardware, or a combination of both.

In box 1302, one or more prediction models may be trained to predict one or more objectives for target clusters. Historical deployment data may be used as training data. Historical deployment data may include details about payloads and details about target clusters. Examples of objectives may include deployment time and deployment risk. In one implementation, the prediction models may be machine-learning models that use a gradient boosting algorithm.

In box 1304, a deployment request may be received from a developer, an administrator, and/or a team. In some implementations, the deployment request may include information about the payload, an identification of target clusters, deployment parameters, and/or deployment constraints. The target clusters may be grouped and/or hierarchically arranged, for example, into AZs, regions, and/or SDP phases. The target clusters, AZs, and/or regions may be redundant backups for one another and therefore restricted from being deployed concurrently. The deployment parameters and constrains may include, for example, cluster orders, batch sizes, bake times, completion percentages, etc.

In box 1306, a shortest path graph problem that models the space of possible deployment plans may be generated. In one implementation, the graph may include state vertices that contain a list of clusters that have been deployed to up to that point. The state vertices may be connected by directed edges containing a deployment action (e.g., a list of clusters deployed to in order to transition from one state to another state), a predicted deployment time for the deployment action, and a predicted deployment risk for the deployment action. The predicted deployment time values and the predicted risk values may be calculated by the prediction models. The graph may also include sink vertices and/or transition vertices that include completion percentage values and/or bake time values.

The entire graph, from the most granular AZ layer to the least granular SDP phase layer, that models every possible deployment plan may be generated ahead of time. However, such a graph may be too massive if the number of target clusters is high. Furthermore, the computational complexity of solving the shortest path problem for such an enormous graph may be NP complete, which may not be feasible in most real-life circumstances. Accordingly, consistent with some implementations of the present concepts, only a partial graph may be initially generated. For example, for a small AZ with only a few clusters, the greedy-brute force method may be selected. Applying the greedy-brute force method, each cluster may be assigned a dominance rank based on the number of other clusters that dominate it with respect to both time and risk. Then, a limited graph may be generated that contains paths that conform to an ascending ordering of the clusters based on the dominance ranking.

Alternatively, for a large AZ with a greater number of clusters, the evolutionary algorithm may be selected. Applying the evolutionary algorithm, an initial population of parent solutions may be randomly generated. Then, a limited graph may be generated to model the initial population of parent solutions. The graph may then be modified as additional solutions are evaluated.

In box 1308, optimal solutions to the shortest path graph problem may be found. A brute force method may be used to evaluate every possible path in the entire graph to find the optimal solutions. However, because the computational complexity of the graph problem is NP complete, this exhaustive technique may not be feasible in real-life scenarios. Alternatively, an optimization algorithm, such as the greedy-brute force method and/or an evolutionary algorithm, may be used to estimate Pareto-optimal solutions to the graph problem. Because these optimization algorithms do not require generating the entire graph ahead of time, a limited graph may be generated in box 1306. In one implementation, the greedy-brute force method may be used in smaller graph problems, and the evolutionary algorithm may be used in larger graph problems. Thus, a set of non-dominated solutions that differ in associated time and risk may be found.

Furthermore, boxes 1306 and 1308 may be repeated from most to least granular layers. That is, boxes 1306 and 1308 may be performed by generating graphs that model AZs of clusters and finding optimal solutions of cluster sequences for each AZ. Then, boxes 1306 and 1308 may be performed again at the less granular layer by generating graphs that model regions of AZs and finding optimal solutions of AZ sequences for each region. Then, boxes 1306 and 1308 may be performed again at the less granular layer by generating graphs that model SDP phases of regions and finding optimal solutions of region sequences for each SDP phase.

In box 1310, a set of deployment plan recommendations may be output. The set of deployment plan recommendations may correspond with the set of non-dominated solutions found in box 1308. Each deployment plan recommendation may include, for example, deployment order, batch size, completion percentage, bake time, estimated overall deployment time, estimated overall deployment risk, and/or any other details pertinent to the deployment request. In one implementation, the set of deployment plan recommendations may be output to an administrator for review and selection.

In box 1312, a selection of a preferred deployment plan may be received from the administrator. For example, the administrator may evaluate the deployment plan recommendations and choose the preferred one based on her preferred deployment time and/or deployment risk.

In box 1314, the selected deployment plan may be performed. In one implementation, the deployment plan chosen by the administrator may be executed by a deployment orchestrator by rolling out the payload to the target clusters according to the selected deployment plan.

After the payload has been deployed, the target clusters may continue to operate (e.g., provide cloud computing services). For example, an application updated by a payload may be executed to run and provide services, an operating system patched up by a payload may be executed, a network device or a computer device whose networking configurations have been modified by a payload may communicate over networks.

Environment

Figure 14:
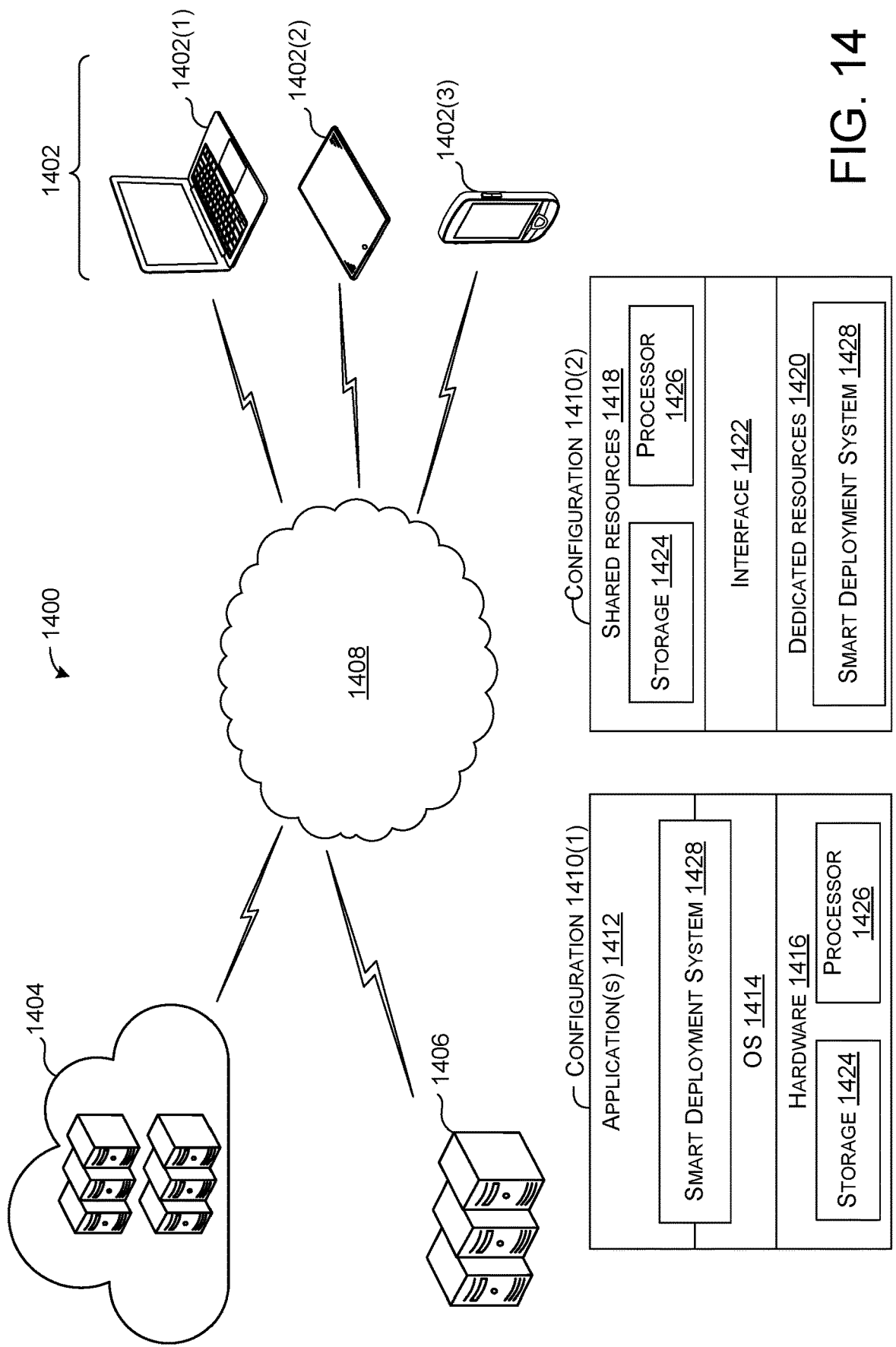
FIG. 14 shows an environment, consistent with some implementations of the present concepts.

FIG. 14 shows an environment 1400, consistent with some implementations of the present concepts. For purposes of explanation, the environment 1400 may include client devices 1402. Examples of the client devices 1402 may include personal computers, desktop computers, servers, notebook computers, cellular phones, smartphones, personal digital assistants, tablets or pad type computers, mobile computers, cameras, appliances, virtual reality headsets, video game consoles, controllers, smart devices, IoT devices, vehicles, watches, wearables, set-top boxes, game systems, automobile entertainment or navigation consoles, etc., and/or any of a myriad of ever-evolving or yet-to-be-developed types of electronic devices. In the example shown in FIG. 14, the client devices 1402 may include a laptop 1402(1), a tablet 1402(2), and a smartphone 1402(3).

The environment 1400 may include a cloud computing fleet 1404. In one implementation, the cloud computing fleet 1404 may include a fleet of server computers that provide one or more cloud services, such as email, photos, videos, streaming, documents, social media, apps, virtual machines, websites, etc.

The term "device," "computer," or "computing device" as used herein can mean any type of electronics that has some amount of processing capability and/or storage capability. Processing capability can be provided by one or more hardware processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, optical storage devices (e.g., CDs, DVDs etc.), and/or remote storage (e.g., cloud-based storage), among others. As used herein, the term "computer-readable media" can include transitory propagating signals. In contrast, the term "computer-readable storage media" excludes transitory propagating signals. Computer-readable storage media may include computer-readable storage devices. Examples of computer-readable storage devices may include volatile storage media, such as RAM, and non-volatile storage media, such as hard drives, optical discs, and flash memory, among others.

Consistent with some implementation of the present concepts, the environment 1400 may include a smart deployment system 1406. The smart deployment system 1406 may include software, hardware, or a combination that implements the present concepts described above. In some implementations, the smart deployment system 1406 may be hosted on one or more devices (e.g., a single computer or multiple computers, such as a cluster of servers).

The smart deployment system 1406 may include machine-learning prediction model, such as a time prediction model and/or a risk prediction model. The smart deployment system 1406 may also include an optimization model capable of using one or more optimization algorithms to solve graph problems that model deployment planning problems. In some implementations, the smart deployment system 1406 may perform all or parts of the smart deployment method 1300, as well as other acts described herein, to deploy updates to the cloud computing fleet 1404.

The client devices 1402, the cloud computing fleet 1404, and the smart deployment system 1406 may communicate with one another via one or more networks 1408. The networks 1408 may include the Internet or be used to access the Internet.

FIG. 14 shows two example device configurations 1410(1) and 1410(2) that can be employed by one or more devices in the smart deployment system 1406. The devices in the smart deployment system 1406 can employ either of the configurations 1410(1) or 1410(2), or an alternate configuration. One instance of each configuration 1410 is illustrated in FIG. 14. The configuration 1410(1) may represent an operating system (OS) centric configuration. The configuration 1410(2) may represent a system-on-chip (SoC) configuration. The configuration 1410(1) can be organized into one or more applications 1412, an operating system 1414, and hardware 1416. The configuration 1410(2) may be organized into shared resources 1418, dedicated resources 1420, and an interface 1422 therebetween. In some implementations, the applications 1412 may include software for performing the smart deployment method 1300, in whole or in part.

In either configuration 1410, the device can include a storage 1424 and a processor 1426. The device can also include a smart deployment system 1428, consistent with the present concepts. In one implementation, the storage 1424 may store software for implementing the smart deployment method 1300, and/or store one or more graphs used in the present concepts.

As mentioned above, the configuration 1410(2) can be thought of as an SoC type design. In such a case, functionality provided by the devices in the smart deployment system 1406 can be integrated on a single SoC or multiple coupled SoCs. The one or more processors 1426 can be configured to coordinate with the shared resources 1418, such as the storage 1424, etc., and/or the one or more dedicated resources 1420, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein can be implemented using software, firmware, hardware (e.g., fixed-logic circuitry), or a combination of these implementations. The term "component" or "module" as used herein generally represents software, firmware, hardware, whole devices or networks, or a combination thereof. In the case of a software implementation, for instance, these may represent program code that performs specified tasks when executed on a processor (e.g., a CPU or CPUs). The program code can be stored in one or more computer-readable memory devices, such as computer-readable storage media. The features and techniques of the component or module may be platform-independent, meaning that they may be implemented on a variety of commercial computing platforms having a variety of processing configurations.

The environment 1400 illustrated in FIG. 14 is merely one example. The environment 1400 need not include all the example elements described in connection with FIG. 14, and the environment 1400 may also include additional elements not explicitly described in connection with FIG. 14.

Advantages and Applications

The technical effects of the present concepts described above may include efficiently solving for optimal deployment plans using, for example, machine-learning prediction models and fast optimization algorithms. Conventional deployment planning primarily relied on random ordering of target clusters or manual effort in ordering the target clusters without relying on data. The technical solutions explained herein may leverage historical deployment data to accurately predict multiple objectives for future deployments. Furthermore, the technical solutions may use artificial intelligence to accurately and efficiently provide metrics to enable finding optimal deployment solutions with minimal human effort.

Moreover, the technical effective of the present concepts may further include quickly finding optimal solutions to massively large graph problems by incorporating efficient optimization algorithms. By reducing the computational complexity of graph problems, finding optimal deployment solutions can be performed very quickly. For example, by leveraging the greedy-brute force method and/or the evolutionary algorithm, the optimization model can efficiently estimate the Pareto-optimal front of solutions that optimize both speed and risk without generating an enormous graph problem. Therefore, deployments can be performed faster, the deployment queue can be reduced, and security risks or bugs can be fixed quickly.

Although the present concepts have been explained above in the context of deploying updates to the cloud, the present concepts may have wide applications in different contexts. For example, a retailer who wants to sell a product to target customers in multiple countries (e.g., United States, China, India, Canada, and Japan) may use the present concepts to determine deployment plans that optimize the retailer's objectives. For example, the target customers in the target countries may be hierarchically grouped into various geographical regions, such as cities, counties, states, provinces, and/or territories, etc. Consistent with the present concepts, the retailer may train machine-learning prediction models to predict the retailer's objectives, such as revenue, profits, customer satisfaction, brand recognition, manufacturing costs, manufacturing time, shipping costs, employee costs, deployment time, etc. The prediction models may be trained based on past historical data derived from how these objectives were affected by rolling out similar products to the target countries or subregions. Feature engineering relating these objectives may involve developing quantifiable metrics for some of the objectives that are typically more quality-based, such as customer satisfaction and/or brand recognition.

The product rollout problem may be modeled by a shortest path graph problem. An optimization model may use one or more optimization algorithms to find optimal solutions that include an optimal ordering of the countries (and an ordering of more granular geographical regions) and estimated objective values (e.g., estimated deployment time, revenue, costs, profits, etc.). Many other parameters may be optimized, such as an optimal price, optimal bargain discounts (e.g., sales and/or marketing campaigns), an optimal batch size (i.e., introduce the product in multiple countries concurrently), an optimal bake time (i.e., time gaps between countries), optimal inventory routing, etc.

It should be apparent from these examples that the present concepts may be used for any optimization problem and may be especially advantageous where the complexity of the problem would conventionally grow exponentially. By predicting objectives and modeling the problem with a graph problem, the complexity of the modeled optimization problem may be reduced and solved more efficiently.

Various examples are described above. Additional examples are described below. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

One example includes a system comprising a processor, a storage having instructions which, when executed by the processor, cause the processor to receive a request to deploy an update to target clusters of computers, the target clusters being grouped in multiple levels, generate multiple layers of graphs having multiple paths that model multiple deployment plans, the graphs including vertices having completed clusters and edges having predicted deployment time values and predicted deployment risk values, finding solutions to shortest path problems presented by the graphs using at least one optimization algorithm, outputting deployment plan recommendations corresponding to the solutions, receiving a selection of a preferred deployment plan from among the deployment plan recommendations, and deploying the update to the target clusters based on the preferred deployment plan.

Another example can include any of the above and/or below examples where the instructions further cause the processor to train a time prediction model and a risk prediction model based on past deployment data, calculate the predicted deployment time values using the time prediction model, and calculate the predicted deployment risk values using the risk prediction model.

Another example can include any of the above and/or below examples where the solutions are approximations of Pareto-optimal solutions that optimize deployment time and deployment risk.

Another example can include any of the above and/or below examples where the preferred deployment plan includes one or more of: a deployment order of the target clusters, a batch size, a completion percentage, a predicted overall deployment time value, and a predicted overall deployment risk value.

Another example can include a computer-readable storage medium storing instructions which, when executed by a processor, cause the processor to receive a deployment planning problem to optimize deployment time and deployment risk while deploying a package to target computers, generate a shortest path graph problem that models the deployment planning problem, the shortest path graph problem including a graph having paths, find solutions that approximate Pareto-optimal solutions to the shortest path graph problem using an optimization algorithm, and output deployment plans that correspond to the solutions, the deployment plans including sequences of the target computers.

Another example can include a method comprising receiving a request to deploy a package to targets, generating a graph that models a deployment planning problem presented by the request, finding a solution to a shortest path problem based on the graph, generating a deployment plan based on the solution, and deploying the package to the targets based on the deployment plan.

Another example can include any of the above and/or below examples where the package is a software update and the targets are clusters of computers.

Another example can include any of the above and/or below examples where the targets are grouped into multiple levels, the method further comprising generating multiple layers of graphs that model the deployment planning problem of deploying the package to the targets in the multiple levels.

Another example can include any of the above and/or below examples where the graph includes state vertices that contain lists of completed targets.

Another example can include any of the above and/or below examples where the graph includes directed edges between the state vertices, the edges are weighted with time values and risk values.

Another example can include any of the above and/or below examples where the method further comprises predicting the time values and the risk values using machine-learning prediction models.

Another example can include any of the above and/or below examples where the method further comprises training the machine-learning prediction models based on features from past deployments of similar packages to similar targets.

Another example can include any of the above and/or below examples where the method further comprises finding multiple solutions to the shortest path problem, the multiple solutions being approximations of Pareto-optimal solutions, generating multiple deployment plans based on the multiple solutions, and outputting the multiple deployment plans.

Another example can include any of the above and/or below examples where the multiple solutions are non-dominated solutions with respect to multiple objectives.

Another example can include any of the above and/or below examples where the multiple objectives include time and risk.

Another example can include any of the above and/or below examples where using at least one of a greedy-brute force algorithm or an evolutionary algorithm to find the multiple solutions.

Another example can include any of the above and/or below examples where using the greedy-brute force algorithm comprises sorting the targets based on a dominance rank with respect to multiple objectives.

Another example can include any of the above and/or below examples where using the evolution algorithm comprises using at least one of mutation evolution or crossover evolution.

Another example can include any of the above and/or below examples where the method further comprises receiving a selection of a preferred deployment plan from among the multiple deployment plans and deploying the package to the targets based on the preferred deployment plan.

Another example can include any of the above and/or below examples where the method further comprises executing an application modified by the package on the targets.

The invention claimed is:

1. A system, comprising:
a processor;
a storage having instructions which, when executed by the processor, cause the processor to:
receive a request to deploy an update to target clusters of computers, the target clusters being grouped in multiple levels;
generate multiple layers of graphs including vertices having completed clusters and edges having predicted deployment time values and predicted deployment risk values, the graphs having multiple paths that model deployment plans that indicate orders of the target clusters based on the completed clusters of the vertices in the multiple paths;
finding solutions to shortest path problems presented by the graphs based on the predicted deployment time values and the predicted deployment risk values of the edges and the completed clusters of the vertices in the graphs using at least one optimization algorithm;
outputting deployment plan recommendations corresponding to the solutions;
receiving a selection of a preferred deployment plan from among the deployment plan recommendations; and
deploying the update to the target clusters based on the preferred deployment plan.

2. The system of claim 1, wherein the instructions further cause the processor to:
train a time prediction model and a risk prediction model based on past deployment data;
calculate the predicted deployment time values using the time prediction model; and
calculate the predicted deployment risk values using the risk prediction model.

3. The system of claim 1, wherein the solutions are approximations of Pareto-optimal solutions that optimize deployment time and deployment risk.

4. The system of claim 1, wherein the preferred deployment plan includes one or more of:
a deployment order of the target clusters;
a batch size;
a completion percentage;
a predicted overall deployment time value; and
a predicted overall deployment risk value.

5. A computer-readable storage medium storing instructions which, when executed by a processor, cause the processor to:
receive a deployment planning problem to optimize deployment time and deployment risk while deploying a package to target computers;
generate a shortest path graph problem including a graph having vertices with completed computers and edges with deployment time values and deployment risk values, the graph having paths that model deployment plans that indicate orders of the target computers based on the completed computers of the vertices in the paths;

find solutions that approximate Pareto-optimal solutions to the shortest path graph problem based on the deployment time values and the deployment risk values of the edges and the completed computers of the vertices in the graph using an optimization algorithm; and output deployment plans that correspond to the solutions, the deployment plans including sequences of the target computers.

6. A method, comprising:

receiving a request to deploy a package to targets;

generating a graph that models a deployment planning problem presented by the request, the graph including state vertices that contain lists of completed targets, the graph including directed edges between the state vertices, the directed edges being weighted with time values and risk values;

finding a solution to a shortest path problem based on the time values and the risk values of the directed edges and the completed targets of the state vertices in the graph;

generating a deployment plan based on the solution; and deploying the package to the targets based on the deployment plan.

7. The method of claim 6, wherein:

the package is a software update; and the targets are clusters of computers.

8. The method of claim 6, wherein:

the targets are grouped into multiple levels, the method further comprising:
  generating multiple layers of graphs that model the deployment planning problem of deploying the package to the targets in the multiple levels.

9. The method of claim 6, further comprising:

predicting the time values and the risk values using machine-learning prediction models.

10. The method of claim 9, further comprising:

training the machine-learning prediction models based on features from past deployments of similar packages to similar targets.

11. The method of claim 6, further comprising:

finding multiple solutions to the shortest path problem, the multiple solutions being approximations of Pareto-optimal solutions, generating multiple deployment plans based on the multiple solutions; and outputting the multiple deployment plans.

12. The method of claim 11, wherein:

the multiple solutions are non-dominated solutions with respect to multiple objectives.

13. The method of claim 12, wherein:

the multiple objectives include time and risk.

14. The method of claim 11, further comprising:

using at least one of a greedy-brute force algorithm or an evolutionary algorithm to find the multiple solutions.

15. The method of claim 14, wherein using the greedy-brute force algorithm comprises:

sorting the targets based on a dominance rank with respect to multiple objectives.

16. The method of claim 14, wherein using the evolution algorithm comprises:

using at least one of mutation evolution or crossover evolution.

17. The method of claim 11, further comprising:

receiving a selection of a preferred deployment plan from among the multiple deployment plans; and deploying the package to the targets based on the preferred deployment plan.

18. The method of claim 17, further comprising:

executing an application modified by the package on the targets.

19. The system of claim 1, wherein the at least one optimization algorithm includes a greedy-brute force algorithm or an evolutionary algorithm.

20. The computer-readable storage medium of claim 5, wherein the instructions further cause the processor to:

predict the deployment time values and the deployment risk values using machine-learning prediction models.

* * * * *